US009866244B2

(12) United States Patent
Srirattana et al.

(10) Patent No.: US 9,866,244 B2
(45) Date of Patent: Jan. 9, 2018

(54) ELECTROMAGNETIC COUPLERS FOR MULTI-FREQUENCY POWER DETECTION

(71) Applicant: SKYWORKS SOLUTIONS, INC., Woburn, MA (US)

(72) Inventors: Nuttapong Srirattana, Billerica, MA (US); David Scott Whitefield, Andover, MA (US); David Ryan Story, Ladera Ranch, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 15/260,544

(22) Filed: Sep. 9, 2016

(65) Prior Publication Data

US 2017/0077967 A1    Mar. 16, 2017

Related U.S. Application Data

(60) Provisional application No. 62/216,431, filed on Sep. 10, 2015.

(51) Int. Cl.
*H04B 1/04* (2006.01)
*H04B 1/00* (2006.01)
*H04B 1/40* (2015.01)

(52) U.S. Cl.
CPC ......... *H04B 1/0458* (2013.01); *H04B 1/0057* (2013.01); *H04B 1/40* (2013.01)

(58) Field of Classification Search
CPC ...... H04B 1/0458; H04B 1/0057; H04B 1/40; H04B 1/02; H04B 1/04; H04B 2001/0408
See application file for complete search history.

(56) References Cited

U.S. PATENT DOCUMENTS 3,611,199 A    10/1971    Safran
3,868,594 A    2/1975    Cornwell et al.
(Continued)

FOREIGN PATENT DOCUMENTS

EP    2503701 A2    9/2012
JP    S62-159502 A    7/1987
(Continued)

OTHER PUBLICATIONS

International Search Report and Written Opinion from corresponding International Application No. PCT/US2016/050924 dated Dec. 16, 2016.

*Primary Examiner* — Nguyen Vo
(74) *Attorney, Agent, or Firm* — Lando & Anastasi, LLP

(57) ABSTRACT

Multi-output electromagnetic couplers configured to detect multiple frequencies simultaneously, and devices and systems including same. In one example a multi-output electromagnetic coupler includes a main coupler transmission line extending between and electrically connecting an input port and an output port, a first coupled line section configured to couple electromagnetic power in a first frequency band from the main coupler transmission line to provide a first coupled output signal at a first coupled port, and a second coupled line section configured to couple electromagnetic power in a second frequency band from the main coupler transmission line to provide a second coupled output signal at a second coupled port simultaneously with the first coupled output signal being provided at the first coupled port.

25 Claims, 21 Drawing Sheets

(56) References Cited

U.S. PATENT DOCUMENTS

| | | |
|---|---|---|
| 4,460,875 A | 7/1984 | Harman |
| 4,677,399 A | 6/1987 | Le Dain et al. |
| 4,764,740 A | 8/1988 | Meyer |
| 5,038,112 A | 8/1991 | O'Neill |
| 5,222,246 A | 6/1993 | Wolkstein |
| 5,276,411 A | 1/1994 | Woodin, Jr. et al. |
| 5,363,071 A | 11/1994 | Schwent et al. |
| 5,487,184 A | 1/1996 | Nagode |
| 5,625,328 A | 4/1997 | Coleman, Jr. |
| 5,745,016 A | 4/1998 | Salminen |
| 5,767,753 A | 6/1998 | Ruelke |
| 6,020,795 A | 2/2000 | Kim |
| 6,078,299 A | 6/2000 | Scharfe, Jr. |
| 6,108,527 A | 8/2000 | Urban et al. |
| 6,329,880 B2 | 12/2001 | Akiya |
| 6,496,708 B1 | 12/2002 | Chan et al. |
| 6,771,141 B2 | 8/2004 | Iida et al. |
| 6,972,640 B2 | 12/2005 | Nagamori et al. |
| 7,042,309 B2 | 5/2006 | Podell |
| 7,305,223 B2 | 12/2007 | Liu et al. |
| 7,319,370 B2 | 1/2008 | Napijalo |
| 7,336,142 B2 | 2/2008 | Vogel |
| 7,493,093 B2 | 2/2009 | Boerman et al. |
| 7,538,635 B2 | 5/2009 | Fukuda et al. |
| 7,546,089 B2 | 6/2009 | Bellantoni |
| 7,966,140 B1 | 6/2011 | Gholson, III et al. |
| 8,175,554 B2 | 5/2012 | Camuffo et al. |
| 8,248,302 B2 | 8/2012 | Tsai et al. |
| 8,289,102 B2 | 10/2012 | Yamamoto et al. |
| 8,315,576 B2 | 11/2012 | Jones |
| 8,417,196 B2 * | 4/2013 | Kitching .................. H03F 3/72 455/126 |
| 8,526,890 B1 * | 9/2013 | Chien .................. H04B 17/12 455/115.1 |
| 8,606,198 B1 | 12/2013 | Wright |
| 9,014,647 B2 | 4/2015 | Kitching et al. |
| 9,214,967 B2 | 12/2015 | Reisner et al. |
| 9,356,330 B1 | 5/2016 | Donoghue et al. |
| 9,496,902 B2 | 11/2016 | Srirattana et al. |
| 9,553,617 B2 | 1/2017 | Srirattana et al. |
| 2002/0113666 A1 | 8/2002 | Yamazaki et al. |
| 2002/0139975 A1 | 10/2002 | Lewis et al. |
| 2003/0214365 A1 * | 11/2003 | Adar .................. H03F 3/602 333/109 |
| 2004/0127178 A1 | 7/2004 | Kuffner |
| 2005/0017821 A1 | 1/2005 | Sawicki |
| 2005/0040912 A1 | 2/2005 | Pelz |
| 2005/0146394 A1 | 7/2005 | Podell |
| 2005/0170794 A1 | 8/2005 | Koukkari et al. |
| 2005/0239421 A1 | 10/2005 | Kim et al. |
| 2006/0232359 A1 | 10/2006 | Fukuda et al. |
| 2007/0159268 A1 | 7/2007 | Podell |
| 2008/0036554 A1 | 2/2008 | Krausse et al. |
| 2008/0056638 A1 | 3/2008 | Glebov et al. |
| 2008/0070519 A1 | 3/2008 | Okabe |
| 2008/0112466 A1 | 5/2008 | Sasaki |
| 2009/0134953 A1 | 5/2009 | Hunt et al. |
| 2009/0195335 A1 | 8/2009 | Wahl et al. |
| 2009/0278624 A1 | 11/2009 | Tsai et al. |
| 2009/0280755 A1 | 11/2009 | Camuffo et al. |
| 2009/0322313 A1 | 12/2009 | Zhang et al. |
| 2011/0057746 A1 | 3/2011 | Yamamoto et al. |
| 2011/0063044 A1 | 3/2011 | Jones |
| 2011/0199166 A1 | 8/2011 | Carrillo-Ramirez |
| 2011/0279192 A1 | 11/2011 | Nash et al. |
| 2011/0298559 A1 | 12/2011 | Kitching et al. |
| 2012/0019332 A1 | 1/2012 | Hino et al. |
| 2012/0019335 A1 | 1/2012 | Hoang et al. |
| 2012/0062333 A1 | 3/2012 | Ezzeddine et al. |
| 2012/0071123 A1 | 3/2012 | Jones et al. |
| 2012/0243579 A1 | 9/2012 | Premakanthan et al. |
| 2013/0005284 A1 | 1/2013 | Dalipi |
| 2013/0113575 A1 | 5/2013 | Easter |
| 2013/0194054 A1 | 8/2013 | Presti |
| 2013/0207741 A1 | 8/2013 | Presti |
| 2013/0241668 A1 | 9/2013 | Tokuda et al. |
| 2013/0293316 A1 | 11/2013 | Kitching et al. |
| 2013/0307635 A1 | 11/2013 | Kase et al. |
| 2014/0266499 A1 | 9/2014 | Noe |
| 2014/0368293 A1 | 12/2014 | Mukaiyama |
| 2015/0002239 A1 | 1/2015 | Tanaka |
| 2015/0043669 A1 | 2/2015 | Ella et al. |
| 2015/0091668 A1 | 4/2015 | Solomko et al. |
| 2015/0200437 A1 | 7/2015 | Solomko et al. |
| 2015/0349742 A1 | 12/2015 | Chen et al. |
| 2015/0372366 A1 | 12/2015 | Frye |
| 2016/0025928 A1 | 1/2016 | Onawa |
| 2016/0028147 A1 | 1/2016 | Srirattana et al. |
| 2016/0028420 A1 | 1/2016 | Srirattana et al. |
| 2016/0043458 A1 | 2/2016 | Sun et al. |
| 2016/0065167 A1 | 3/2016 | Granger-Jones et al. |
| 2016/0079649 A1 | 3/2016 | Ilkov et al. |
| 2016/0079650 A1 | 3/2016 | Solomko et al. |
| 2016/0172737 A1 | 6/2016 | Srirattana et al. |
| 2016/0172738 A1 | 6/2016 | Srirattana et al. |
| 2016/0172739 A1 | 6/2016 | Srirattana et al. |
| 2016/0172740 A1 | 6/2016 | Srirattana et al. |
| 2016/0268994 A1 * | 9/2016 | Granger-Jones ........ H01F 38/14 |
| 2016/0344430 A1 | 11/2016 | Srirattana et al. |
| 2016/0344431 A1 | 11/2016 | Srirattana et al. |
| 2017/0033428 A1 * | 2/2017 | Ootsuka .................. H01P 5/18 |
| 2017/0063425 A1 * | 3/2017 | Khlat ...................... H04B 1/40 |
| 2017/0085245 A1 | 3/2017 | Srirattana et al. |

FOREIGN PATENT DOCUMENTS

| | | |
|---|---|---|
| JP | 2000-077915 A | 3/2000 |
| JP | 2013126067 | 6/2013 |
| KR | 20040037465 A | 5/2004 |
| KR | 20110118289 A | 10/2011 |
| KR | 20120007790 A | 1/2012 |
| WO | 2005018451 A1 | 3/2005 |
| WO | 2015020927 A2 | 2/2015 |
| WO | 2015134979 A1 | 9/2015 |

* cited by examiner

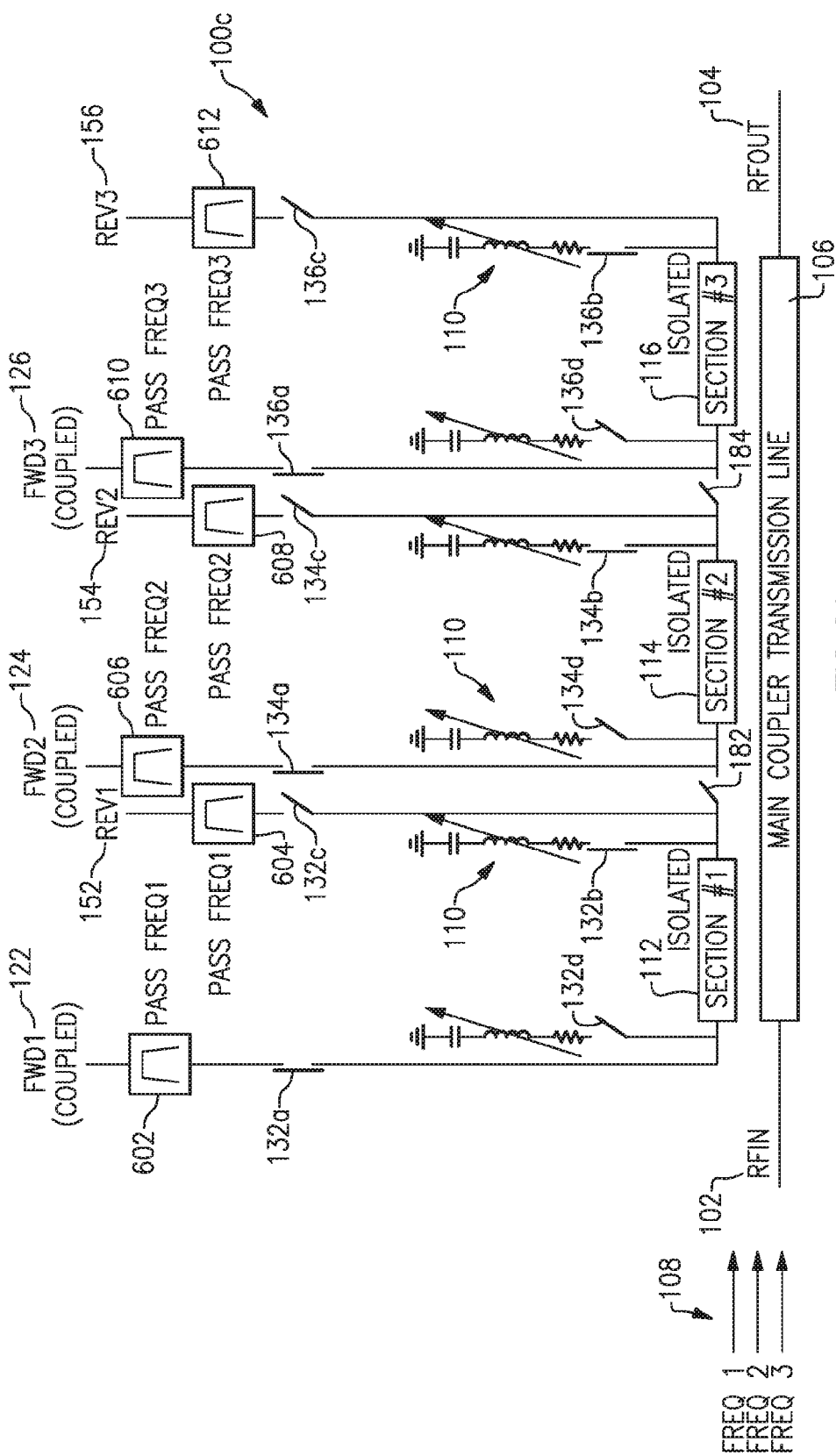

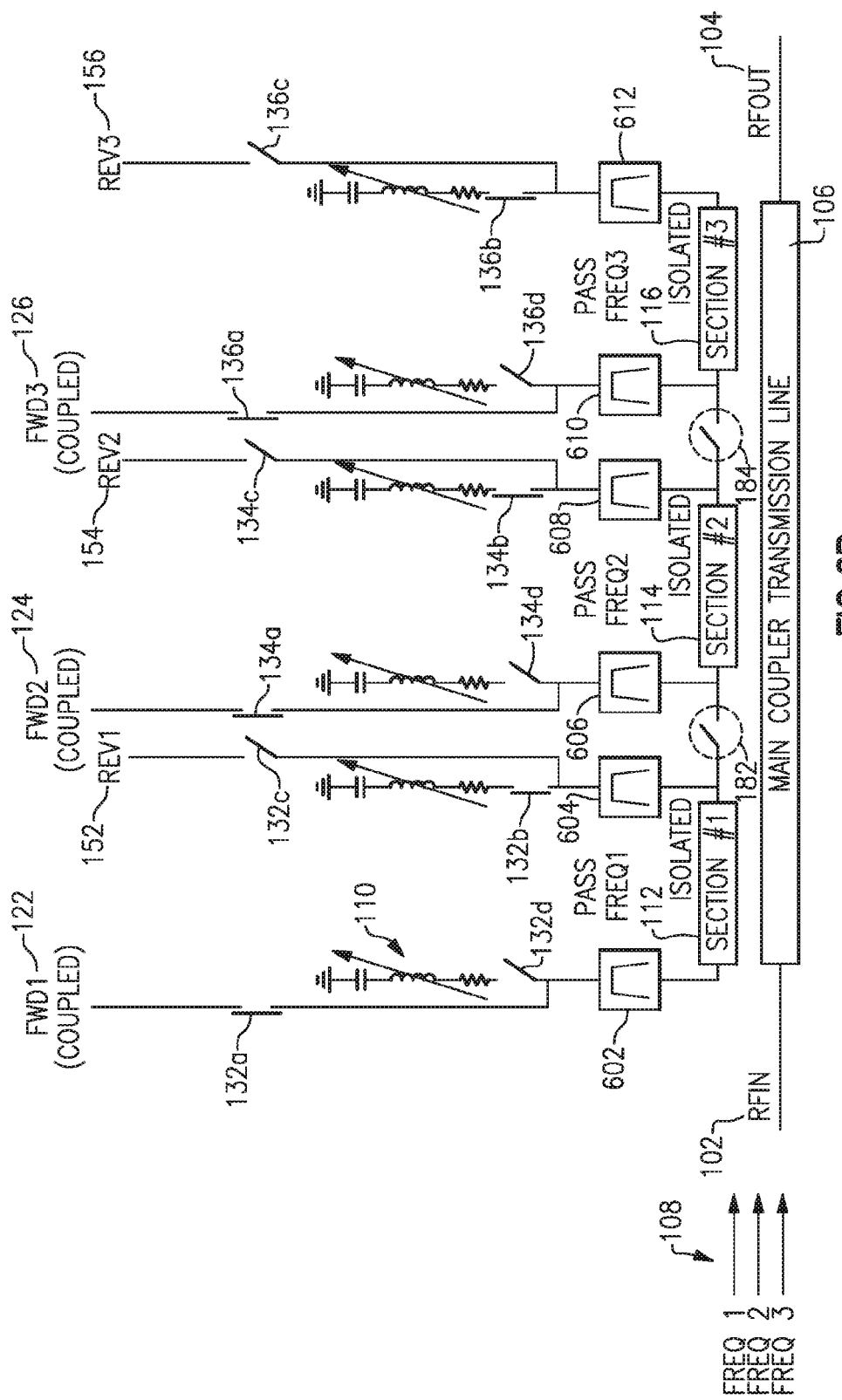

ELECTROMAGNETIC COUPLERS FOR MULTI-FREQUENCY POWER DETECTION

CROSS REFERENCE TO RELATED APPLICATIONS

This application claims the benefit of priority under 35 U.S.C. §119(e) and PCT Article 8 to U.S. Provisional Patent Application No. 62/216,431 filed on Sep. 10, 2015, which is incorporated herein by reference in its entirety for all purposes.

BACKGROUND

Wireless devices generate electromagnetic (EM) signals, typically within the electromagnetic spectrum at a Radio Frequency (RF) capable of propagating to other wireless devices for communication purposes. When an electromagnetic signal generated by a source is provided to a load, such as to an antenna, a portion of the signal can be reflected back from the load. An electromagnetic coupler can be included in a signal path between the source and the load to provide an indication of forward power of the electromagnetic signal traveling from the source to the load and/or an indication of reverse power reflected back from the load. Electromagnetic couplers include, for example, directional couplers, bi-directional couplers, multi-band couplers (e.g., dual band couplers), and the like.

An EM coupler typically has an input port, an output port, a coupled port, and an isolated port. When a termination impedance is presented to the isolated port, an indication of forward EM power traveling from the input port to the output port is provided at the coupled port. When a termination impedance is presented to the coupled port, an indication of reverse EM power traveling from the output port to the input port is provided at the isolated port. The termination impedance is typically implemented as a 50 Ohm shunt resistor in a variety of conventional EM couplers.

An EM coupler has a coupling factor, which represents how much power is provided to the coupled port of the EM coupler relative to the power of an EM signal at the input port. EM couplers typically cause an insertion loss in an EM signal path. Thus, an EM signal received at the input port of an EM coupler generally has a lower power when provided at the output port of the EM coupler. Insertion loss can be due to a portion of the EM signal being provided to the coupled port (or to the isolated port) and/or to losses associated with the main transmission line of the EM coupler. In addition, traditional EM couplers add insertion loss to a signal path even when unused. This can degrade an EM signal even when the EM coupler is not being used to detect power.

SUMMARY OF INVENTION

Aspects and embodiments relate to electronic systems and, in particular, to electromagnetic (EM) couplers, such as, but not limited to, radio frequency (RF) couplers.

According to one embodiment, a multi-output electromagnetic (EM) coupler comprises a main coupler transmission line extending between and electrically connecting an input port and an output port, a first coupled line section configured to couple electromagnetic power in a first frequency band from the main coupler transmission line to provide a first coupled output signal at a first coupled port, and a second coupled line section configured to couple electromagnetic power in a second frequency band from the main coupler transmission line to provide a second coupled output signal at a second coupled port simultaneously with the first coupled output signal being provided at the first coupled port.

In one example the multi-output EM coupler further comprises a first frequency selective component selectively connected to the first coupled port and configured to pass the first frequency band and to reject the second frequency band. The multi-output EM coupler may further comprise a second frequency selective component selectively connected to the second coupled port and configured to pass the second frequency band and to reject the first frequency band. In one example each of the first and second frequency selective components is one of a lowpass filter, a bandpass filter, and a highpass filter. In another example the first and second frequency selective components form part of a diplexer configured to direct the first and second coupled output signals to a common EM coupler output port.

In another example the multi-output EM coupler further comprises a first series switch disposed between the first coupled line section and the second coupled line section and configured to selectively connect the first coupled line section and the second coupled line section together in series.

The multi-output EM coupler may further comprise a third coupled line section configured to couple EM power in a third frequency band from the main coupler transmission line to provide a third coupled output signal at a third coupled port.

In one example the multi-output EM coupler further comprises a third frequency selective component selectively connected to the third coupled port and configured to pass the third frequency band and to reject the first and second frequency bands. The third frequency selective component can be a lowpass filter, a bandpass filter, or a highpass filter, for example. In one example the first, second, and third frequency selective components form part of a triplexer configured to direct the first, second, and third coupled output signals to a common EM coupler output port. In another example at least one of the first, second, and third frequency selective components is adjustable.

In another example the multi-output EM coupler further comprises a second series switch disposed between the second coupled line section and the third coupled line section and configured to selectively connect the second coupled line section and the third coupled line section together in series. The multi-output EM coupler may further comprise a switch network configured to selectively decouple the second coupled line section from the main coupler transmission line when both the first and second series switches are open.

In one example the first coupled line section is connected to a first isolated port, the second coupled line section is connected to a second isolated port, and the third coupled line section is connected to a third isolated port. In such an example the multi-output EM coupler may further comprise a first termination load connected to the first isolated port, a second termination load connected to the second isolated port, and a third termination load connected to the third isolated port. In one example at least one of the first, second, and third termination loads is an adjustable termination impedance circuit. The adjustable termination impedance circuit can include a switch network and a plurality of passive impedance elements, for example. The multi-output EM coupler may further comprise a memory configured to store an impedance value for the adjustable termination impedance circuit, and a control circuit connected to the memory and to the adjustable termination impedance circuit, and configured to control the switch network to selectively couple together ones of the plurality of passive impedance elements to set a termination impedance provided by the adjustable termination impedance circuit to the impedance value.

One embodiment is directed to coupler module comprising an example of the multi-output EM coupler.

Another embodiment is directed to a system comprising an example of the multi-output EM coupler, a transceiver configured to produce an EM transmit signal, and an antenna switch module configured to connect the transceiver to the multi-output EM coupler and to direct the EM transmit signal to the input port of the multi-output EM coupler. In one example the system further comprises a power amplifier connected between the transceiver and the antenna switch module, the power amplifier being configured to receive and amplify the EM transmit signal. The system may further comprise an antenna connected to the output port of the multi-output EM coupler, the antenna being configured to transmit the EM transmit signal and to receive an EM receive signal. In one example the multi-output EM coupler is further configured to receive the EM receive signal at the output port and to provide the EM receive signal at the input port, and the antenna switch module is further configured to direct the EM receive signal to the transceiver. The system can be a wireless device, for example. The wireless device may further comprise at least one processor, a computer readable medium, a controller, and a battery.

Another embodiment is directed to a module comprising an example of the multi-output EM coupler, and an antenna switch module connected to an input port of the multi-output EM coupler. The module may further comprise a power amplifier connected to the antenna switch module, the antenna switch module being connected between the power amplifier and the multi-output EM coupler. According to another embodiment a wireless device comprises an example of the module, and a transceiver configured to produce an EM transmit signal and to receive an EM receive signal. The wireless device may further comprise an antenna coupled to the multi-output EM coupler and configured to transmit the EM transmit signal and to receive the EM receive signal. The wireless device may further comprise at least one of a battery, a computer readable medium, a controller, and at least one processor.

According to another embodiment a bi-directional multi-output radio frequency (EM) coupler comprises a main coupler transmission line connecting an input port and an output port, a first coupled line section selectively connected between a first forward coupled port and a first forward isolated port or between a first reverse coupled port and a first reverse isolated port, the first coupled line section configured to couple EM power in a first frequency band from the main coupler transmission line to provide a first coupled signal at one of the first forward coupled port and the first reverse coupled port, and a second coupled line section selectively connected between a second forward coupled port and a second forward isolated port or between a second reverse coupled port and a second reverse isolated port, the second coupled line section configured to couple EM power in a second frequency band from the main coupler transmission line to provide a second coupled signal at one of the second forward coupled port and the second reverse coupled port simultaneously with the first coupled signal being provided, the first and second frequency bands being different from one another.

In one example the bi-directional multi-output EM coupler further comprises a first switch network configured to selectively connect the first coupled line section to either the first forward coupled and isolated ports or the first reverse coupled and isolated ports, and a second switch network configured to selectively connect the second coupled line section to either the second forward coupled and isolated ports or the second reverse coupled and isolated ports. In one example the first switch network includes a first mode select switch configured to selectively connect the first coupled line section to the first forward coupled port, a second mode select switch configured to selectively connect the first coupled line section to the first reverse coupled port, and a first isolation switch configured to selectively connect a first termination load to the first forward isolated port when the first mode select switch is closed and the second mode select switch is open, and to selectively connect the first termination load to the first reverse isolated port when the first mode select switch is open and the second mode select switch is closed. In another example the second switch network includes a third mode select switch configured to selectively connect the second coupled line section to the second forward coupled port, a fourth mode select switch configured to selectively connect the second coupled line section to the second reverse coupled port, and a second isolation switch configured to selectively connect a second termination load to the second forward isolated port when the third mode select switch is closed and the fourth mode select switch is open, and to selectively connect the second termination load to the second reverse isolated port when the third mode select switch is open and the fourth mode select switch is closed. In another example the first switch network includes a first pair of mode select switches operable to alternatively connect the first coupled line section to either the first forward coupled port or the first reverse coupled port, and a first isolation switch operable to alternatively connect one of the first forward isolated port and the first reverse isolated port to a first termination load. The second switch network may include a second pair of mode switches operable to alternatively connect the second coupled line section to either the second forward coupled port or the second reverse coupled port, and a second isolation switch operable to alternatively connect one of the second forward isolated port and the second reverse isolated port to a second termination load.

In one example each of the first and second termination loads includes at least one of a resistive element, a capacitive element, and an inductive element. In one example at least one of the resistive element, the capacitive element, and the inductive element is adjustable. In another example at least one of the first and second termination loads includes an adjustable termination impedance circuit. In one example the adjustable termination impedance circuit includes a termination switch network and a plurality of passive impedance elements, the termination switch network being operable to selectively connect together ones of the plurality of passive impedance elements to set a termination impedance value provided by the adjustable termination impedance circuit. The bi-directional multi-output EM coupler may further comprise a memory configured to store the termination impedance value, and a control circuit coupled to the memory and then termination switch network and configured to control the termination switch network to selectively connect together the ones of the plurality of passive impedance elements to set the termination impedance value. In one example the plurality of passive impedance elements includes at least one of resistive elements, capacitive elements, and inductive elements.

According to one example the bi-directional multi-output EM coupler further comprises a first series switch operable to connect the first and second coupled line sections together in series.

In another example the bi-directional multi-output EM coupler further comprises a first frequency selective component selectively connected to at least one of the first forward coupled port and the first reverse coupled port, the first frequency selective component being configured to pass the first frequency band and to reject the second frequency band. The bi-directional multi-output EM coupler may further comprise a second frequency selective component selectively connected to at least one of the second forward coupled port and the second reverse coupled port, the second frequency selective component being configured to pass the second frequency band and to reject the first frequency band. In one example the first frequency band is lower than the second frequency band, the first frequency selective component is a lowpass filter, and the second frequency selective component is a highpass filter. In another example the first and second frequency selective components are bandpass filters. In another example at least one of the first and second frequency selective components is adjustable.

The bi-directional multi-output EM coupler may further comprise a third coupled line section selectively connected between a third forward coupled port and a third forward isolated port or between a third reverse coupled port and a third reverse isolated port, the third coupled line section configured to couple EM power in a third frequency band from the main coupler transmission line to provide a third coupled signal at one of the third forward coupled port and the third reverse coupled port, the third frequency band being different from the first and second frequency bands. In one example the bi-directional multi-output EM coupler further comprises a second series switch operable to connect the second and third coupled line sections together in series. The bi-directional multi-output EM coupler may further comprise a third frequency selective component selectively connected to at least one of the third forward coupled port and the third reverse coupled port, the third frequency selective component being configured to pass the third frequency band and to reject the first and second frequency bands. In one example the first, second, and third frequency selective components form part of a triplexer configured to direct the first, second, and third coupled output signals to a common EM coupler output port. In another example at least one of the first, second, and third frequency selective components is adjustable. In another example the first frequency selective component is connected between a common first coupler output and the first forward coupled port and the first reverse coupled port.

Another embodiment is directed to a coupler module comprising an example of the bi-directional multi-output EM coupler.

According to another embodiment a wireless device comprises an example of the coupler module, an antenna coupled to the output port of the bi-directional multi-output EM coupler, a transceiver configured to produce an EM transmit signal, and an antenna switch module configured to connect the transceiver to the multi-output EM coupler and to direct the EM transmit signal to the input port of the multi-output EM coupler. The wireless device may further comprise at least one power amplifier connected between the transceiver and the antenna switch module, the at least one power amplifier being configured to receive and amplify the EM transmit signal. The wireless device may further comprise at least one of a controller, a battery, a computer readable medium, and at least one processor.

Another embodiment is directed to a wireless device comprising an example of the bi-directional multi-output EM coupler, an antenna coupled to the output port of the bi-directional multi-output EM coupler, a transceiver configured to produce an EM transmit signal, and an antenna switch module configured to connect the transceiver to the multi-output EM coupler and to direct the EM transmit signal to the input port of the multi-output EM coupler. The wireless device may further comprise at least one power amplifier connected between the transceiver and the antenna switch module, the at least one power amplifier being configured to receive and amplify the EM transmit signal. In one example the wireless device further comprises at least one of a controller, a battery, a computer readable medium, and at least one processor.

According to another embodiment a system comprises an example of the bi-directional multi-output EM coupler, a transceiver configured to produce an EM transmit signal, and an antenna switch module configured to connect the transceiver to the multi-output EM coupler and to direct the EM transmit signal to the input port of the multi-output EM coupler. The system may further comprise a power amplifier connected between the transceiver and the antenna switch module, the power amplifier being configured to receive and amplify the EM transmit signal. In one example the system further comprises an antenna connected to the output port of the multi-output EM coupler, the antenna being configured to transmit the EM transmit signal and to receive an EM receive signal. In another example of the system the multi-output EM coupler is further configured to receive the EM receive signal at the output port and to provide the EM receive signal at the input port, and the antenna switch module is further configured to direct the EM receive signal to the transceiver.

According to another embodiment a module comprises an example of the bi-directional multi-output EM coupler, and an antenna switch module connected to an input port of the bi-directional multi-output EM coupler. In one example the module further comprises a power amplifier connected to the antenna switch module, the antenna switch module being connected between the power amplifier and the bi-directional multi-output EM coupler. According to another embodiment wireless device comprises an example of the module, a transceiver coupled to the antenna switch module and configured to produce an EM transmit signal, the antenna switch module being configured to provide the EM transmit signal to the input port of the bi-directional multi-output EM coupler, and an antenna coupled to the output port of the bi-directional multi-output EM coupler and configured to transmit the EM transmit signal and to receive an EM receive signal, the antenna switch module being further configured to provide the EM receive signal from the input port of the bi-directional multi-output EM coupler to the transceiver. The wireless device may further comprise at least one of a controller, a battery, a computer readable medium, and at least one processor.

According to another embodiment a coupler module comprises a laminate substrate having a first conductive layer, a second conductive layer, and a dielectric layer separating the first and second conductive layers, and a multi-output electromagnetic coupler formed in the laminate substrate, the multi-output electromagnetic coupler including a main coupler transmission line formed in the first conductive layer and extending between and electrically connecting an input port and an output port, a first coupled line section formed in one of the first and second conductive layers, and a second coupled line section formed in one of the first and second conductive layers, the first coupled line section being configured to couple electromagnetic power in a first frequency band from the main coupler transmission line to provide a first coupled output signal at a first coupled port, and the second coupled line section being configured to couple electromagnetic power in a second frequency band from the main coupler transmission line to provide a second coupled output signal at a second coupled port simultaneously with the first coupled output signal being provided at the first coupled port.

In one example the coupler module further comprises at least one die mounted to the laminate substrate and connected to one of the input port, the output port, the first coupled port, and the second coupled port. The die may be a power amplifier die connected to the input port, or an antenna switch die connected to one of the input port and the output port, for example.

According to another embodiment a coupler module comprises a laminate substrate, and a multi-output electromagnetic coupler die mounted on the laminate substrate, the multi-output electromagnetic coupler die including a main coupler transmission line extending between and electrically connecting an input port and an output port, a first coupled line section configured to couple electromagnetic power in a first frequency band from the main coupler transmission line to provide a first coupled output signal at a first coupled port, and a second coupled line section configured to couple electromagnetic power in a second frequency band from the main coupler transmission line to provide a second coupled output signal at a second coupled port simultaneously with the first coupled output signal being provided at the first coupled port.

In one example the coupler module further comprises a power amplifier die mounted on the laminate substrate and connected to the input port of the multi-output electromagnetic coupler die. In another example the coupler module further comprises an antenna switch die mounted on the laminate substrate and connected to one of the input port and the output port of the multi-output electromagnetic coupler die.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 6A is a circuit diagram illustrating another example of a multi-output EM coupler incorporating frequency selective components according to aspects of the present invention;

FIG. 6B is a circuit diagram illustrating another example of a multi-output EM coupler incorporating frequency selective components according to aspects of the present invention;

DETAILED DESCRIPTION

Figure 1:
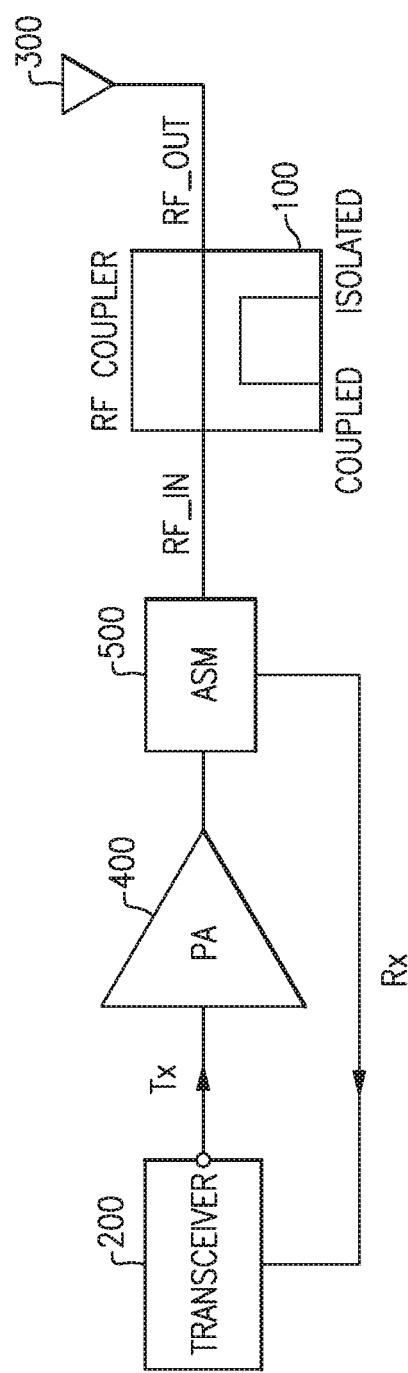
FIG. 1 is a block diagram of one example of an electronic system in which embodiments of the multi-output EM couplers according to aspects of the present invention may be used.

Bi-directional EM couplers have forward (FWD) and reverse (REV) coupled ports to couple signals received at either the input port (RFIN) or output port (RFOUT). The directivity of an EM coupler, which is a measure of how well the EM coupler provides a portion of power in only one direction and not the other, is dependent on the termination impedance. In a bi-directional EM coupler, when the forward coupled port is configured for the coupled mode, the reverse coupled port is terminated with an impedance selected to provide a high directivity for the forward coupled port, and vice versa. However, in conventional EM couplers, the termination impedance is typically at a fixed impedance value that provides a desired directivity only for a specific frequency or narrow band of frequencies around the specific frequency of interest. Thus, when operating outside of this frequency band, the directivity of the EM coupler will not be optimized.

Similarly, the coupling factor of an EM coupler, which is a measure of the amount or fraction of the input signal power that is provided at the coupled port, is frequency-dependent, and conventional EM couplers can have limitations related to having a fixed coupling factor optimized for a particular frequency or narrow range of frequencies. The coupling factor for a given EM coupler is a logarithmic function of frequency dependent on the physical structure of the coupler. For example, the coupling factor is dependent on the line widths and lengths of the coupler and on the manner in which the main line and coupled line are designed to be capacitively and inductively coupled to one another. Thus, in conventional EM couplers, the coupling factor cannot be adjusted for one frequency without affecting the coupling factor at another frequency. Conventional EM couplers may also have a fixed insertion loss, which is the reduction in signal energy from the input to the output, at a given frequency. Insertion loss is a function of the coupling factor, e.g., the portion of signal energy removed so as to be provided at the coupled port, plus resistive loss of the main transmission line that electrically connects the input port to the output port.

Due to these limitations, conventional EM couplers typically provide good performance only at one particular frequency, or a narrow band of frequencies, at any given time. Accordingly, to detect power at multiple frequencies (or multiple bands), one must either accept poor performance from a single coupler at certain frequencies, or use multiple couplers, each optimized for a particular frequency or frequency band. Neither solution is ideal. Using multiple couplers requires large amounts of space and may have associated signal multiplexing complications.

Aspects and embodiments are directed to structures for EM couplers having the capability for simultaneous power detection at multiple frequencies, as well as rapid, easy reconfigurability for optimization for different frequencies and/or combinations of frequencies in the forward or reverse direction. This capability may be highly desirable in numerous applications. For example, in communication transceivers it may be desirable that all EM signals pass through a single EM coupler located close to the antenna. Aspects and embodiments of the EM couplers disclosed herein can meet this objective for multiple operating frequencies of the transceiver. New mobile phone standards are emerging for receiving and/or transmitting data on multiple carrier frequencies simultaneously. In mobile phone applications, the ability to accurately monitor and control signal power can be critical. Accordingly, embodiments of the EM couplers disclosed herein may provide important functionality to systems implementing these new standards that is not available from conventional EM couplers.

Certain embodiments provide a single, multi-section EM coupler that can provide multiple signal outputs and therefore provide for operation at multiple different frequencies. As discussed in more detail below, certain aspects apply the use of multiple coupled lines in conjunction with switches to form switched coupled line networks to allow for optimization of a multi-output coupler having a desired coupling factor and directivity in the frequency bands of interest. For example, different switch networks may be arranged to combine two or more coupled line sections, depending on the number of different frequencies to be separately detected. The coupling factor and directivity of the individual couplers formed by each coupled line section (or combinations of coupled line sections) can be separately optimized for each frequency band of interest. In certain examples, directivity of the couplers can be optimized using termination adjustment techniques, as discussed further below. In addition, certain embodiments include the use of frequency selective components (e.g., various filters, diplexers, triplexers, etc.) to allow for improvement in insertion loss of the main transmission path of the EM coupler by reducing coupling of bands that are not of interest, and thereby reducing lost energy of those bands to unnecessary coupling.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a schematic block diagram of one example of a system in which an EM coupler 100 is configured to extract a portion of power of an EM signal traveling between a transceiver 200 and an antenna 300. In this example, the EM coupler 100 is a bi-directional coupler. As illustrated, in the forward or transmit direction, a power amplifier 400 receives an EM signal from the transceiver 200 and provides an amplified EM signal to the antenna 300 by way of an antenna switch module 500 and the EM coupler 100 operating in the forward mode. Similarly, in the receive direction, a received EM signal is provided from the antenna 300 to the transceiver 200 via the EM coupler 100 (operating in the reverse mode) and the antenna switch module 500. It will be understood by those skilled in the art that additional elements (not illustrated) can be included in the electronic system of FIG. 1 and/or a subcombination of the illustrated elements can be implemented. Further, components of the system may be arranged in an order different from that shown in FIG. 1. For example, the EM coupler 100 may be positioned between the power amplifier 400 and the antenna switch module 500, rather than between the antenna switch module and the antenna 300, as shown.

The antenna switch module 500 can selectively electrically connect the antenna 300 to a selected transmit path or a selected receive path. The antenna switch module 500 can provide a number of switching functionalities. The antenna switch module 500 can include a multi throw switch configured to provide functionalities associated with, for example, switching between transmit and receive modes, switching between transmit or receive paths associated with different frequency bands, switching between transmit or receive paths associated with different modes of operation, or any combination thereof.

The power amplifier 400 amplifies an EM signal. The power amplifier 400 can be any suitable EM power amplifier. For example, the power amplifier 400 can include one or more of a single stage power amplifier, a multi-stage power amplifier, a power amplifier implemented by one or more bipolar transistors, or a power amplifier implemented by one or more field effect transistors. The power amplifier 400 can be implemented on a GaAs die, CMOS die, or a SiGe die, for example.

The antenna 300 can transmit the amplified EM signal, and receive EM signals. For example, when the electronic system illustrated in FIG. 1 is included in a cellular phone, the antenna 300 can transmit an EM signal from the cellular phone to a base station, and similarly receive EM signals from the base station.

When the electronic system illustrated in FIG. 1 is operating in a transmit mode, the EM coupler 100 can extract a portion of the RF signal power traveling between the power amplifier 400 and the antenna 300. The EM coupler 100 can generate an indication of forward RF power traveling from the power amplifier 400 to the antenna 300 and/or generate an indication of reflected (reverse) power traveling from the antenna 300 to the power amplifier 400. An indication of power can be provided to a power detector (not illustrated). Similarly, operating in the receive mode, the EM coupler 100 can extract a portion of the power of an RF signal received by the antenna 300 and travelling between the antenna 300 and the antenna switch module 500. The EM coupler 100 has four ports, namely, an input port, an output port, a coupled port, and an isolated port. In the configuration of FIG. 1, the input port can receive the amplified EM signal from the power amplifier 400 and the output port can provide the amplified EM signal to the antenna 300. A termination impedance can be connected to the isolated port (for forward operation) or to the coupled port (for reverse operation). When the termination impedance is connected to the isolated port, the coupled port can provide a portion of the power of the EM signal traveling from the input port to the output port. Accordingly, the coupled port can provide an indication of forward EM power. When the termination impedance is connected to the coupled port, the isolated port can provide a portion of the power of the EM signal traveling from the output port to the input port. Accordingly, the isolated port can provide an indication of reverse EM power.

Figure 2:
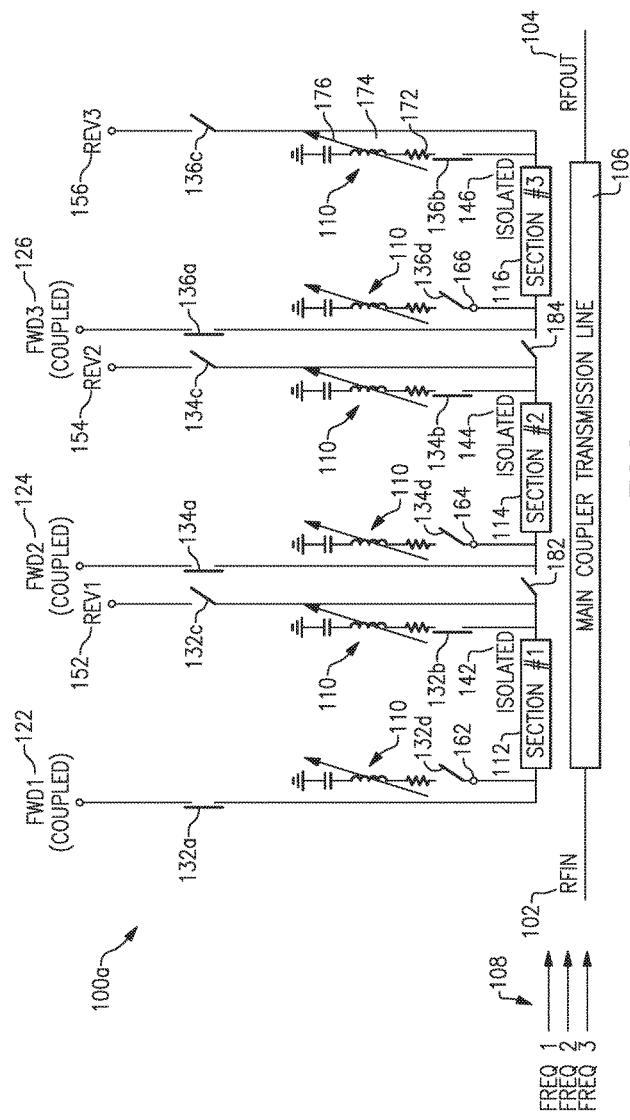
FIG. 2 is a circuit diagram of one example of a multi-output EM coupler according to aspects of the present invention.

Referring to FIG. 2, there is illustrated a circuit diagram of one example of a multi-output EM coupler according to certain embodiments, which may be used in the system of FIG. 1, for example. The EM coupler 100*a* has an input port (RFIN) 102, and an output port (RFOUT) 104, and a main transmission line 106 electrically connecting the input port and the output port. In the illustrated example, the EM coupler 100*a* is a bi-directional coupler and includes three coupled line sections 112, 114, and 116. However, those skilled in the art will appreciate, given the benefit of this disclosure, that embodiments of the EM coupler are not limited to having three coupled line sections and may be easily modified to include only two coupled line sections or more than three coupled line sections. When operating in the forward mode, the EM coupler 100*a* receives one or more input frequencies 108 at the input port 102. When operating in the reverse mode, the input frequencies 108 are alternatively received at the output port 104. In the illustrated example, there are three coupled line sections 112, 114, 116 that correspond to three input frequencies 108 (freq1, freq2, and freq3); however, as discussed above, those skilled in the art will readily appreciate that the structure may be modified to accommodate more or fewer input frequencies. As used herein, the term "input frequency" is intended to refer to an EM signal comprised of a single carrier frequency or having a certain, typically relatively narrow, bandwidth covering a range of frequencies.

Each coupled line section 112, 114, 116 is switchably connected to either a forward coupled port or a reverse coupled port, and a corresponding termination load at the respective isolated port. As illustrated in FIG. 2, the EM coupler 100*a* is configured for operation in the forward direction. Accordingly, the first coupled line section 112 is connected to a first forward coupled port (FWD1) 122 via a mode select switch 132*a* being in the closed position, and to a termination load 110 at a first isolated port 142 via an isolation switch 132*b* being in the closed position. Thus, a first coupler is formed by the main transmission line 106 and the first coupled line section 112, having the input port 102, the output port 104, the first forward coupled port 122, and the first isolated port 142 connected to ground via the termination load 110. The first coupler can be reconfigured for reverse operation by opening switches 132*a* and 132*b*, and closing switches 132*c* and 132*d* to connect the first coupled line section 112 to a first reverse coupled port (REV1) 152 and first reverse isolated port 162, respectively. The forward and reverse coupled ports 122, 152, and forward and reverse isolated ports 142, 162 are referred to individually herein for clarity; however, those skilled in the art will appreciate that the forward coupled port 122 and reverse isolated port 162 may be the same physical port, and that the forward isolated port 142 and reverse coupled port 152 may be the same physical port, with the functionality altered via operation of the mode select and isolation switches 132*a-d*.

Similarly, for operation of the EM coupler 100*a* in the forward direction, as shown in FIG. 2, a second coupler is formed by the main transmission line 106 and the second coupled line section 114, having the input port 102, the output port 104, a second forward coupled port 124, and a second isolated port 144 connected to ground via a termination load 110. The second coupled line section 114 is connected to the second forward coupled port (FWD2) 124 via a mode select switch 134a being in the closed position, and to a termination load 110 at the second isolated port 144 via an isolation switch 134b being in the closed position. The second coupler can be reconfigured for reverse operation by opening switches 134a and 134b, and closing switches 134c and 134d to connect the second coupled line section 114 to a second reverse coupled port (REV2) 154 and second reverse isolated port 164, respectively. The forward and reverse coupled ports 124, 154, and forward and reverse isolated ports 144, 164 are referred to individually herein for clarity; however, those skilled in the art will appreciate that the forward coupled port 124 and reverse isolated port 164 may be the same physical port, and that the forward isolated port 144 and reverse coupled port 154 may be the same physical port, with the functionality altered via operation of the mode select and isolation switches 134a-d.

Similarly, for operation of the EM coupler 100a in the forward direction, as shown in FIG. 2, a third coupler is formed by the main transmission line 106 and the third coupled line section 116, having the input port 102, the output port 104, a third forward coupled port 126, and a third isolated port 146 connected to ground via a termination load 110. The third coupled line section 116 is connected to the third forward coupled port (FWD3) 126 via a mode select switch 136a being in the closed position, and to the termination load 110 at the third isolated port 146 via an isolation switch 136b being in the closed position. The third coupler can be reconfigured for reverse operation by opening switches 136a and 136b, and closing switches 136c and 136d to connect the third coupled line section 116 to a third reverse coupled port (REV3) 156 and a third reverse isolated port 166, respectively. The forward and reverse coupled ports 126, 156, and forward and reverse isolated ports 146, 166 are referred to individually herein for clarity; however, those skilled in the art will appreciate that the forward coupled port 126 and reverse isolated port 166 may be the same physical port, and that the forward isolated port 146 and reverse coupled port 156 may be the same physical port, with the functionality altered via operation of the mode select and isolation switches 136a-d.

The three couplers formed by the three coupled line sections 112, 114, 116 and associated terminations can be optimized independently of one another. For example, the length and/or width of the coupled line section 112, 114, or 116, respectively, and termination loads 110 of each coupler can be optimized to obtain a desired coupling factor and/or directivity at the frequency of interest of the respective coupled line section. This arrangement allows for multiple independent couplers to be constructed based on a signal transmission path, and is therefore significantly more compact than conventional systems that require multiple couplers.

In the example illustrated in FIG. 2, the termination loads 110 are shown including a resistive element 172, an adjustable inductive element 174, and a capacitive element 176; however, those skilled in the art will appreciate, given the benefit of this disclosure, that many variations of the termination loads 110 may be implemented. For example, any one or more of the resistive, inductive, and/or capacitive elements may be made adjustable. Additionally, any of the termination loads 110 may exclude any one or more of the resistive, inductive, and/or capacitive elements. For example, a termination load may be implemented using a resistive element and a fixed or adjustable capacitive element, without including an inductive element. Many other variations are possible. Certain examples of adjustable termination loads 110 which may be used with one or more of the coupled line sections 112, 114, and/or 116 are discussed in more detail below.

Additionally, any of the pairs of isolation switches (i.e., 132b and 132d, 134b and 134d, and/or 136b and 136d) can be replaced with a double pole single throw switch (not illustrated) to selectively connect the respective forward and reverse isolated ports to the same termination load 110. Similarly, any of the pairs of mode select switches (i.e., 132a and 132c, 134a and 134c, and/or 136a and 136c) can be replaced with a double pole double throw switch (not illustrated).

According to certain embodiments, two or more of the coupled line sections 112, 114, 116 may be selectively connected together in series using series switches 182 and 184. As shown in FIG. 2, series switches 182 and 184 are open, such that the three coupled line sections 112, 114, and 116 form independent couplers. However, in other examples, the first and second coupled line sections 112 and 114 can be connected together by closing series switch 182. Alternatively, or in combination, the second and third coupled line sections 114 and 116 can be connected together by closing series switch 184. Series connection of two or more coupled line sections allows for modification of the coupling factor of the associated coupler formed by the connected sections.

Figure 3:
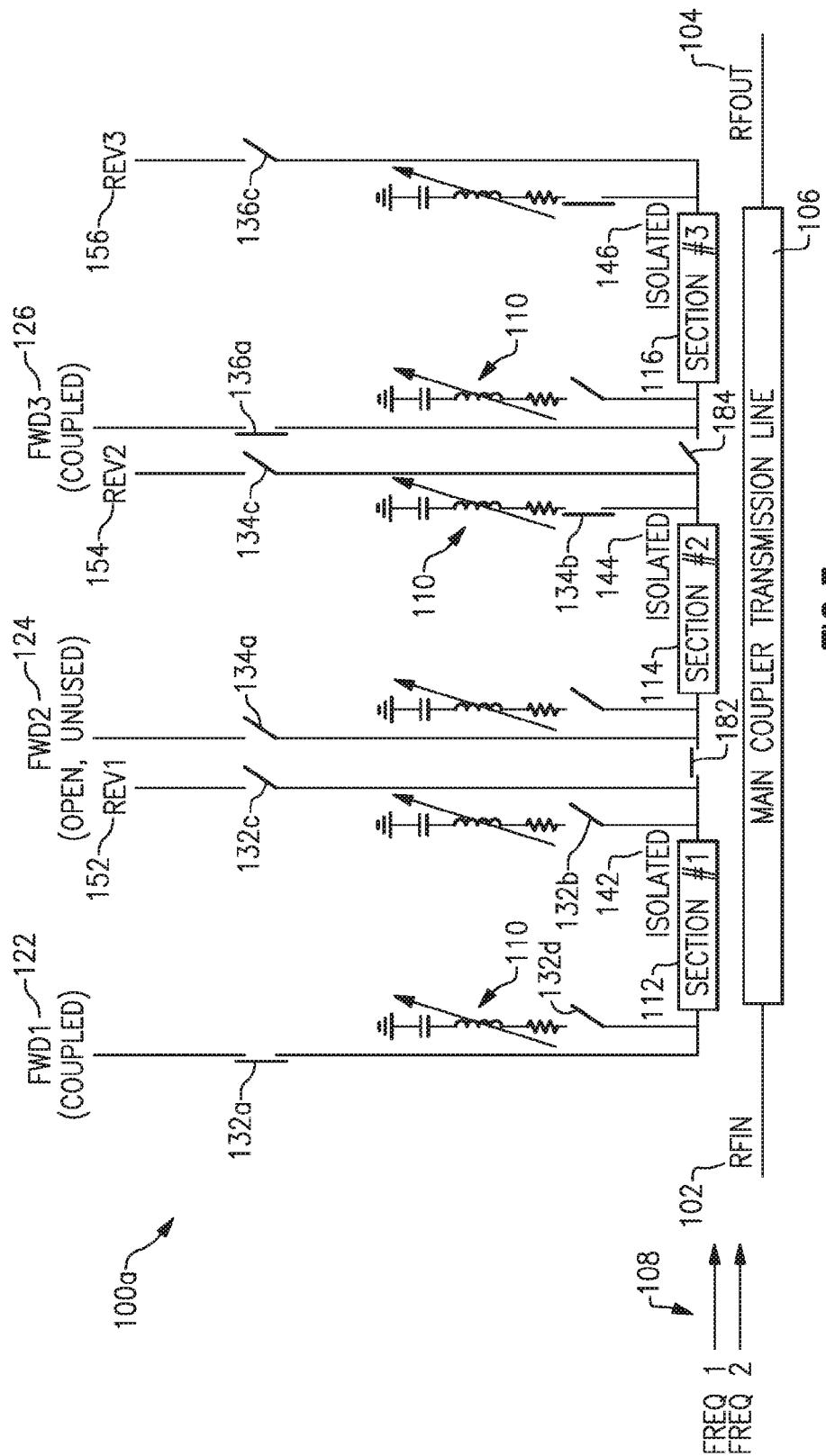
FIG. 3 is a circuit diagram illustrating another configuration of the EM coupler of FIG. 2, according to aspects of the present invention.

FIG. 3 illustrates an example of the EM coupler 100a in which the series switch 182 is closed, connecting coupled line sections 112 and 114 together to form one coupler, while series switch 184 remains open such that coupled line section 116 forms a second, independent coupler sharing the same main transmission line 106. This arrangement may be useful in circumstances where the input frequencies 108 include two frequencies (freq1 and freq2 in the illustrated example). In the example shown in FIG. 3, the EM coupler 110 is configured for forward operation, and the third coupled line section 116 is connected as discussed above with reference to FIG. 2. As the first and second coupled line sections 112 and 114 are connected together to operate as a single coupler, the mode select switch 132a is closed to connect the first coupled line section 112 to the first forward coupled port 122, and the isolation switch 134b is closed to connect the second coupled line section 114 to the termination load 110 at the second isolated port 144. Switches 132b and 134a are open to disconnect the first isolated port 142 and second forward coupled port 124, respectively, as these ports are unused in this configuration.

As discussed above, the insertion loss of an EM coupler is impacted by the coupling factor. A high coupling factor necessarily imparts high insertion loss due to a high amount of the input signal power being coupled off the main transmission line and provided at the coupled port rather than at the output port. As discussed above, the multi-port EM coupler 100a provides the benefit of being able to perform power detection at multiple different frequencies simultaneously using individual couplers formed using the different switchably connected coupled line sections 112, 114, and 116. However, in certain circumstances, it may not be necessary or desired to operate at all the frequencies for which the various coupled line sections have been optimized, and accordingly, one or more coupled line sections may be unused for power detection. In such circumstances, it is desirable to avoid the insertion loss caused due to the coupling factor of the unused coupled line section(s), particularly if any of those sections have high coupling factors.

Figure 4:
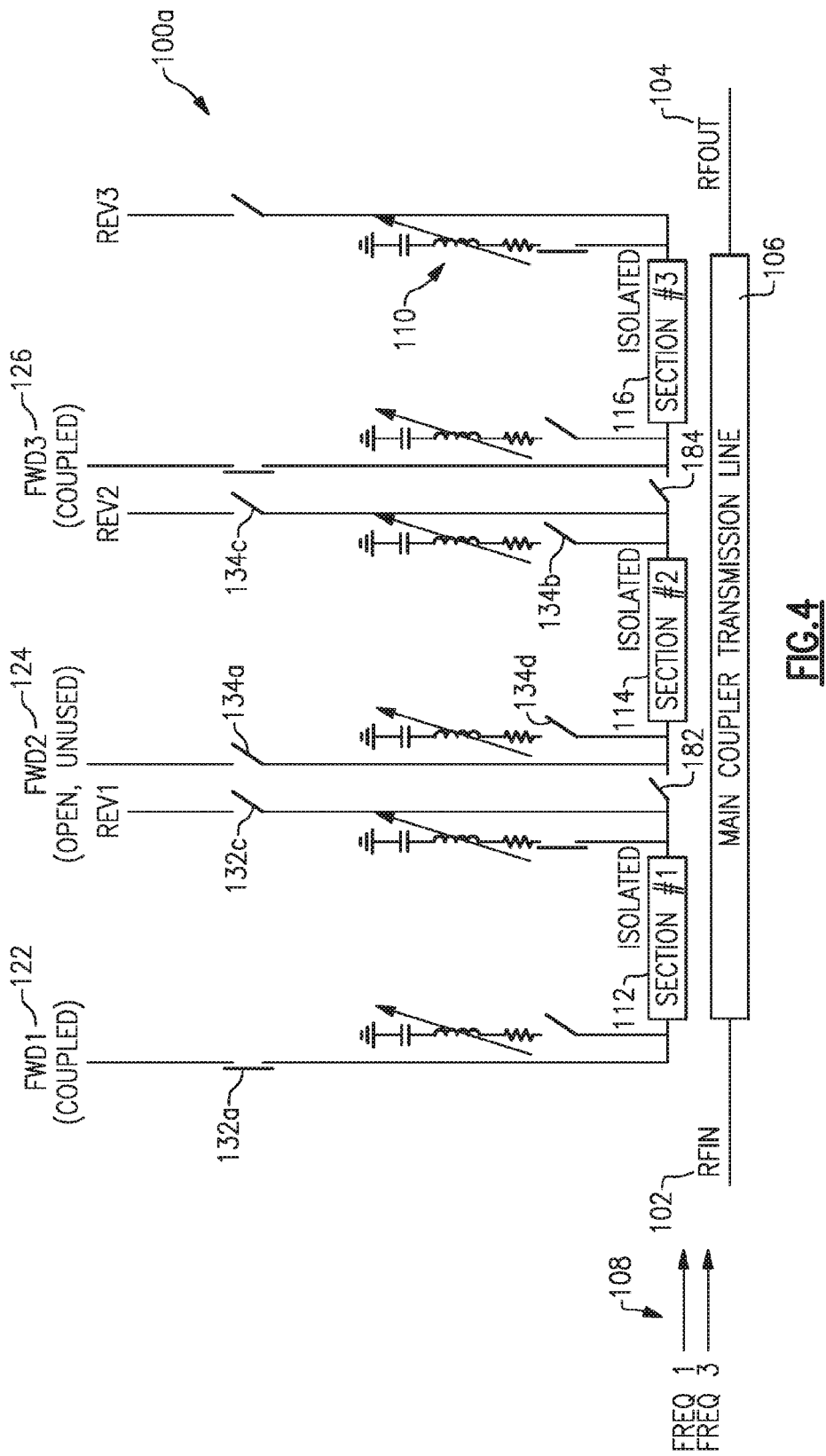
FIG. 4 is a circuit diagram illustrating another configuration of the EM coupler of FIG. 2, according to aspects of the present invention.

FIG. 4 illustrates an example of the EM coupler 100a in which the second coupled line section 114 has been decoupled from the main transmission line 106. For example, the input frequencies 108 may, at certain times, exclude the second frequency (freq2) for which the second coupled line section 114 was optimized. Alternatively, it may be unnecessary or undesired to detect the input frequency freq2, even if present among the input frequencies 108. Accordingly, as shown in FIG. 4, the switches 134a, 134b, 134c, and 134d can all be set to open, along with series switches 182 and 184 also being open, thereby causing the second coupled line section 114 to appear as an open circuit, and effectively decoupling it from the main transmission line 106. This improves the insertion loss in the main transmission line 106 due to removal of the effects of the coupling factor of the second coupled line section 114. As the second coupled line section 114 has been open circuited, there is little to no coupling occurring on the second coupled line section 114, and therefore the second coupled line section 114 does not contribute to insertion loss on the main transmission line 106 due to coupling effects. As noted above, this can be particularly beneficial when the second coupled line section 114 (or any other coupled line section that can be disconnected through appropriate opening of its associated switches) has a high coupling factor, such as −10 dB for example. As will be appreciated by those skilled in the art, given the benefit of this disclosure, although the second coupled line section 114 is shown disconnected in FIG. 4, the principle is readily extendible to the other coupled line sections, and embodiments of the EM coupler 100a may be configured to have any one or more coupled line sections switchably disconnected at any given time.

As discussed above, the directivity of an EM coupler is dependent on the termination impedance at the isolated port, which in conventional couplers is typically a fixed impedance value, and therefore the desired directivity may be achieved only for a particular frequency. To allow for the ability to optimize the directivity of any one or more of the EM couplers formed by the coupled line sections 112, 114, and/or 116 over multiple frequencies, certain aspects of this disclosure relate to providing an adjustable termination impedance that is electrically connected to the isolated port (forward or reverse) of an EM coupler. A variety of termination impedance circuits can be configured to provide adjustable termination impedances. Certain examples are discussed below, and further examples are disclosed in the related patent applications identified above. Such circuits can implement desired characteristics of an EM coupler, such as a desired directivity. In certain embodiments, the isolation switches (e.g., 132b and 132d) are configured to selectively connect or isolate an adjustable termination impedance circuit to or from the forward or reverse isolated ports (e.g., 142 and 162) of the EM coupler.

Adjusting the termination impedance electrically connected to a port of an EM coupler can improve directivity of the EM coupler by providing a desired termination impedance for certain operating conditions, such as a frequency band of a radio frequency signal provided to the EM coupler or a power mode of an electronic system that includes the EM coupler. In certain embodiments, a switch network can selectively electrically couple different termination loads to one or more isolated ports of embodiments of the multi-output EM coupler 100a responsive to one or more control signals, as discussed further below. The switch network can adjust the termination impedance of the EM coupler to improve directivity across multiple frequency bands. In certain embodiments, an adjustable termination impedance circuit includes a plurality of switches that can be used to adjust the termination impedance provided to an isolated port of the EM coupler by selectively providing resistance, capacitance, inductance, or any combination thereof in a termination path. The termination impedance circuit can provide any suitable termination impedance by selectively electrically coupling passive impedance elements in series and/or in parallel in the termination path. The termination impedance circuit can thereby provide a termination load having a desired impedance value.

Figure 5:
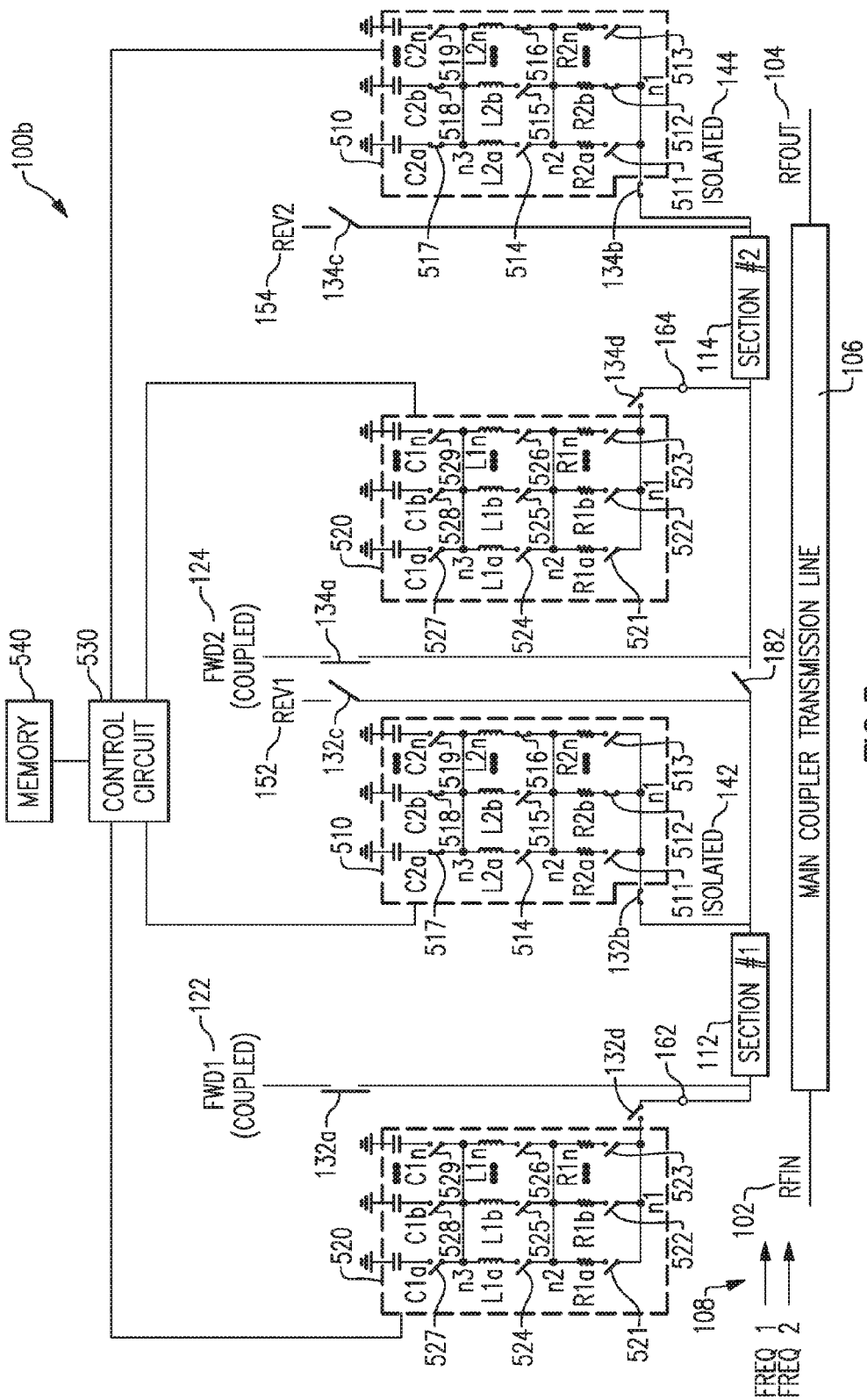
FIG. 5 is a circuit diagram illustrating an example of the use of adjustable termination loads in a multi-output EM coupler according to aspects of the present invention.

FIG. 5 is a schematic diagram of one example of a multi-output EM coupler 100b including adjustable termination impedance circuits configured to provide adjustable termination impedances according to one embodiment. In the illustrated example, the multi-output EM coupler 100b includes the first coupled line section 112 and the second coupled line section 114, which may be electrically connected in series using the series switch 182, as discussed above. The EM coupler 100b further includes first adjustable termination impedance circuits 510 selectively connected to the forward isolated ports 142, 144 via isolation switches 132b and 134b, respectively, and second adjustable termination impedance circuits 520 selectively connected to the reverse isolated ports 162, 164 via isolation switches 132d and 134d, respectively. However, those skilled in the art will appreciate, given the benefit of this disclosure, that the EM coupler 100b can be readily extended to include the coupled line section 116 and one or more additional coupled line sections, along with additional first and second adjustable termination impedance circuits as appropriate. Further, the EM coupler 100b can include more elements than illustrated and/or a subcombination of the illustrated elements can be implemented, and the EM coupler 100b can be implemented in accordance with any suitable combination of the principles and advantages discussed herein. The isolation switches 132b, 132d, 134b, 134d can electrically isolate tuning elements of the adjustable termination impedance circuits 510, 520 from the ports of the EM coupler 100b when the adjustable termination impedance circuit is not providing a termination load to the respective port of the EM coupler. This can reduce loading effects, such as off capacitances of switches of the adjustable termination impedance circuit, on the port of the EM coupler. Accordingly, the isolation switches 132b, 132d, 134b, 134d can permit the insertion loss due to the associated port of the EM coupler to be decreased.

The termination impedance circuits 510 and 520 are tunable to provide a desired termination impedance to the respective ports of the EM coupler 100b to which they are connected. For example, the termination impedance circuits 520 can be tuned to provide a desired termination impedance to the reverse isolated ports 162, 164 of the EM coupler 100b. The termination impedance circuit 520 can tune the resistance, capacitance, inductance, and/or combinations thereof provided to the reverse isolated ports 162 and/or 164 of the EM coupler 100b. Similarly, the termination impedance circuit 510 can be tuned to adjust the resistance, capacitance, inductance, and/or combinations thereof provided to the forward isolated ports 142 and/or 144 of the EM coupler 100b to thereby provide a desired termination impedance to the respective ports. Such tunability can be advantageous for post-design configuration, compensation, and/or optimization.

Although FIG. 5 illustrates separate termination impedance circuits 510, 520 for the forward and reverse isolated ports of the EM coupler 100b, in certain embodiments, a termination impedance circuit can be shared by an isolated port and a coupled port (forward isolated and reverse isolated ports) of a bi-directional coupler. This can reduce the area relative to having separate termination impedance circuits for the forward and reverse isolated ports. Only one of the forward isolated port or the reverse isolated port can be provided with a termination impedance at a time to provide an indication of EM power. Accordingly, a switch circuit can selectively electrically connect the termination impedance circuit to the forward isolated port and selectively electrically connect the termination impedance circuit to the reverse isolated port such that no more than one of these ports is electrically connected to the termination impedance circuit at a time. To electrically isolate the coupled port and the isolated port, the switch circuit can include high isolation switches. Each of the high isolation switches can include a series shunt series circuitry topology, for example. The isolation between the forward and reverse isolated ports provided by the high isolation switches can be greater than a target directivity.

Referring to FIG. 5, the termination impedance circuit 510 can tune the termination impedance provided to the forward isolated ports 142, 144 by providing series and/or parallel combinations of passive impedance elements. As illustrated in FIG. 5, the termination impedance circuit 510 includes switches 511 to 519 and passive impedance elements R2a to R2n, L2a to L2n, and C2a to C2n. Each of the switches 511 to 519 can selectively switch in a respective passive impedance element to the termination impedance provided to the forward isolated port 142 or 144. In the termination impedance circuit 510 illustrated in FIG. 5, at least three switches should be on in order to provide a termination path between a connection node n1 and ground.

The switches of the termination impedance circuit 510 illustrated in FIG. 5 include three banks of parallel switches 511 to 513, 514 to 516, and 517-519 in series with each other. A first bank of switches 511 to 513 is coupled between connection node n1 and a first intermediate node n2. The second bank of switches 514 to 516 is coupled between the first intermediate node n2 and a second intermediate node n3. The third bank of switches 517 to 519 is coupled between the second intermediate node n3 and a reference potential, such as ground. Having banks of switches in parallel with other banks of parallel switches can increase the number of possible termination impedance values provided by the termination impedance circuit 510. For example, when the termination impedance circuit 510 includes three banks of three parallel switches in series with each other, the termination impedance circuit can provide 343 different termination impedance values by having one or more of the switches in each bank of switches on while the other switches are off.

The illustrated termination impedance circuit 510 includes series circuits that include a passive impedance element and a switch in parallel with other series circuits that include other passive impedance elements and other switches. For instance, a first series circuit that includes the switch 511 and the resistor R2a is in parallel with a second series circuit that includes switch 512 and the resistor R2b. The termination impedance circuit 510 includes switches 514 to 516 to switch inductors L2a to L2n, respectively, in series with one or more resistors R2a to R2n. The switches 514 to 516 can also switch two or more of the inductors L2a to L2n in parallel with each other. The termination impedance circuit 510 also includes switches 517 to 519 to switch capacitors C2a to C2n, respectively, in series with one or more resistor-inductor (RL) circuits. The switches 517 to 519 can also switch two or more of the capacitors C2a to C2n in parallel with each other.

As illustrated in FIG. 5, in one example, the switches 512, 516, 517, and 518 can be on while the other switches in the termination impedance circuit 510 are off. This can provide a termination impedance to the forward isolated port(s) 142, 144 of the EM coupler 100b that includes the resistor R2b in series with inductor L2n in series with the parallel combination of capacitors C2a and C2b. As noted above, and as will be appreciated by those skilled in the art, a wide variety of other combinations can be configured as well, and certain examples may include only series switches.

The termination impedance circuit 510 can include passive impedance elements having arbitrary values, binary weighted values, values to compensate for variations, values for a particular application, the like, or any combination thereof. While the termination impedance circuit 510 can provide RLC circuits, the principles and advantages discussed herein can be applied to a termination impedance circuit that can provide any suitable combination of circuit elements such as one or more resistors, one or more inductors, one or more capacitors, one or more RL circuits, one or more RC circuits, one or more LC circuits, or one or more RLC circuits to provide a desired termination impedance. Such combinations of circuit elements can be arranged in any suitable series and/or parallel combination.

The switches 511 to 519 can be implemented by field effect transistors. Alternatively, or additionally, one or more switches of the termination impedance circuit 510 can be implemented by MEMS switches, fuse elements (e.g., fuses or antifuses), or any other suitable switch element.

While the termination impedance circuit 510 illustrated in FIG. 5 includes switches, a tunable termination impedance can alternatively or additionally be provided by other variable impedance circuits. For instance, the termination impedance circuit can implement a tunable termination impedance using an impedance element having an impedance that varies as a function of a signal provided to the impedance element. As one example, a field effect transistor operating in the linear mode of operation can provide an impedance dependent on a voltage provided to its gate. As another example, a varactor diode can provide a variable capacitance as a function of voltage provided to the varactor diode.

The illustrated termination impedance circuit 520 can function substantially the same as the illustrated termination impedance circuit 510 except that the termination impedance circuit 520 can provide a termination impedance to the reverse isolated ports 162, 164 instead of the forward isolated ports 142, 144. In certain examples, the impedances of the passive impedance elements of the termination impedance circuit 520 can be substantially the same as corresponding passive impedance elements of the termination impedance circuit 510. In other examples, one or more of the passive impedance elements of the termination impedance circuit 520 can have a different impedance value than a corresponding passive impedance element of the termination impedance circuit 510. In certain embodiments (not illustrated), the termination impedance circuit 520 and the termination impedance circuit 510 can have circuit topologies that are different from each other.

As discussed above, the isolation switches 132b, 132d, 134b, and 134d can serve to provide isolation between the respective ports of the EM coupler 100b and the termination impedance circuits 510 and 520, respectively. According to certain embodiments, each of the isolation switches 132b, 132d, 134b, 134d can selectively electrically connect a port of the EM coupler 100b to a termination impedance circuit 510 or 520, respectively, responsive to a control signal received at a control termination of the respective isolation switch. For example, as illustrated in FIG. 5, the isolation switch 132d is electrically connected between the reverse isolated port 162 of the EM coupler 100b and the termination impedance circuit 520. The isolation switch 132d can be off when the forward coupled port 122 is providing indication of forward EM power. When the isolation switch 132d is off, the isolation switch 132d can separate the loading of the termination impedance circuit 520 from the coupled port 122. In particular, the isolation switch 132d can isolate switches 521 to 523 of the first bank of switches of the termination impedance circuit 520 from the coupled port 122 when the isolation switch 132d is off. The first bank of switches 521 to 523 in turn isolate the remaining elements of the termination impedance circuit 520 from the isolation switch 132d. This can improve insertion loss by removing loading of the switches 521 to 523 on the coupled port 122 of the EM coupler 100b. With the isolation switch 132d, there are two switches in series (i.e., isolation switch 132d and one of switches 521, 522, and 523) between any passive impedance element of the termination impedance circuit 520 and the coupled port 122 of the EM coupler 100b in the illustrated embodiment. When the reverse coupled port 152 is providing an indication of reverse EM power, the isolation switch 132d can be on to electrically connect the termination impedance circuit 520 to the reverse isolated port 162, and the isolation switch 132b can be off (open) to isolate the termination impedance circuit 510 from the reverse coupled port 152.

As will be appreciated by those skilled in the art, given the benefit of this disclosure, the other isolation switches 134b, and 134d may operate in a similar manner. For example, the isolation switch 134b can be off when the reverse coupled port 154 is providing an indication of reverse EM power (not illustrated) and on when the forward coupled port 124 is providing an indication of forward EM power as illustrated. Aside from the different connections and different timing when the switches are activated and deactivated, the isolation switches 132b, 132d, 134b, and 134d can be substantially the same. Both of the isolation switches 132b and 132d, or 134b and 134d, can be off in a decoupled state.

The isolation switches 132b, 132d, 134b, and 134d can be implemented by a field effect transistor, for example. In certain implementations, the isolation switches can be implemented by a switch in series between the connection node n1 and the respective port of the EM coupler 100b and a shunt switch connected to the connection node n1. According to some implementations, the isolation switches can be implemented by a series-shunt-series switch topology. The isolation switches can each be implemented by a single throw switch, a single pole switch, or single pole, single throw switch.

In various embodiments, data indicative of a desired termination impedance can be stored in a memory 540 and a state of any one or more of the switches 511-519 in the termination impedance circuit 510 and/or switches 521-529 in the termination impedance circuit 520 can be set based at least partly on the stored data. In some implementations, the memory can include persistent memory, such as fuse elements (e.g., fuses and/or antifuses), to store the data. In other implementations, the memory 540 can include volatile memory elements. The memory 540 can be embodied on a same die as control circuit 530 and/or termination impedance circuits 510 and 520. The memory 540 can be included in the same package as the EM coupler 100b.

Still referring to FIG. 5, the control circuit 530 is in communication with the memory 540. The control circuit 530 is configured to provide one or more control signals to set the state of the one or more switches of the termination impedance circuits 510 and 520 based at least partly on the data stored in the memory 540. The memory 540 and the control circuit 530 can together configure the termination impedance circuits 510 and/or 520 after the EM coupler 100b has been manufactured. This can configure a termination impedance provided to the EM coupler 100b to compensate for a variety of changing conditions, including, for example, process variations, changing frequency bands of operation, changing application parameters, changing desired output characteristics, and the like.

According to certain embodiments, the performance of a multi-output EM coupler as described above may be further enhanced through the use of frequency selective components associated with one or more of the coupled paths.

Referring to FIG. 6A, there is illustrated one example of a multi-output EM coupler 100c including frequency selective components in each of the forward and reverse coupled paths. In the illustrated example, the first coupler formed by the first coupled line section 112 and the main transmission line 106 includes a first frequency selective component 602 connected to the first forward coupled port 122 and positioned between the first mode select switch 132a and the first forward coupled port 122, and a second frequency selective component 604 connected to the first reverse coupled port 152 and positioned between the mode select switch 132c and the first reverse coupled port 152, as shown. Similarly, the second coupler formed by the second coupled line section 114 and the main transmission line 106 includes a first frequency selective component 606 connected between the mode select switch 134a and the second forward coupled port 124, and a second frequency selective component 608 connected between the mode select switch 134c and the second reverse coupled port 154. The third coupler formed by the third coupled line section 116 and the main transmission line 106 similarly includes a first frequency selective component 610 connected between the mode select switch 136a and the third forward coupled port 126, and a second frequency selective component 612 connected between the mode select switch 136c and the third reverse coupled port 156. The frequency selective components 602-612 can be filters, for example.

In the example illustrated in FIG. 6A, the frequency selective components 602-612 are positioned between the mode select switches and respective forward and reverse coupled ports. In an alternate arrangement, the frequency selective components can be positioned between the coupled line sections and the respective mode select switches, as shown, for example, in FIG. 6B. Referring to FIG. 6B, the first frequency selective component 602 is positioned before the mode select switches 132a and 132d. In other words, the mode select switch 132a is positioned between the first frequency selective component 602 and the first forward coupled port 122, and the mode select switch 132d is positioned between the first frequency selective component 602 and the termination load 110. Similarly, the second frequency selective component 604 is located before the mode select switches 132b and 132c. The remaining frequency selective components 606-612 are similarly positioned, as shown in FIG. 6B. In certain practical implementations of the EM couplers, the coupler traces (e.g., the first, second and/or third coupled line sections 112, 114, and/or 116, and the main transmission line 106) and the frequency selective components 602-612 can be produced in the same material or substrate. Accordingly, manufacture and integration of the devices can be simplified if the frequency selective components 602-612 are located in close proximity to the coupled line sections 112, 114, and 116.

According to one embodiment, each of the frequency selective components 602-612 has a characteristic such that it allows only a frequency or frequency band of interest to pass, and provides low (poor) return loss (also referred to as impedance mismatch) to frequencies outside of the frequency band of interest. Thus, as shown in FIGS. 6A and 6B, in certain examples, the frequency selective components are bandpass filters. In this case, the respective frequency selective component appears essentially open-circuited, and there will be little to no coupling mechanism, outside of the frequency band of interest, and hence little to no insertion loss due to the coupling effect. This can help to reduce the multiple coupling-effect losses otherwise associated with the multiple coupled line sections (112, 114, 116) in frequency bands where some coupled line sections are not needed or used. In certain embodiments, any one or more of the frequency selective components 602-612 can be adjustable to allow the passed frequency band of interest to be adjusted, for example, to accommodate changing operational parameters or applications.

Although in the examples illustrated in FIGS. 6A and 6B the frequency selective components 602-612 are bandpass filters, those skilled in the art will appreciate, given the benefit of this disclosure, that a wide variety of other configurations can be implemented. For example, referring to FIGS. 7A and 7B, in certain embodiments some of the frequency selective components can be lowpass or highpass filters rather than bandpass filters. As discussed above with reference to FIGS. 6A and 6B, in certain embodiments the frequency selective components can be positioned between the mode select switches and the respective output ports, as shown in FIG. 7A, whereas in other embodiments, the frequency selective components can be positioned between the coupled line sections and the mode select switches, as shown in FIG. 7B.

Figure 7A:
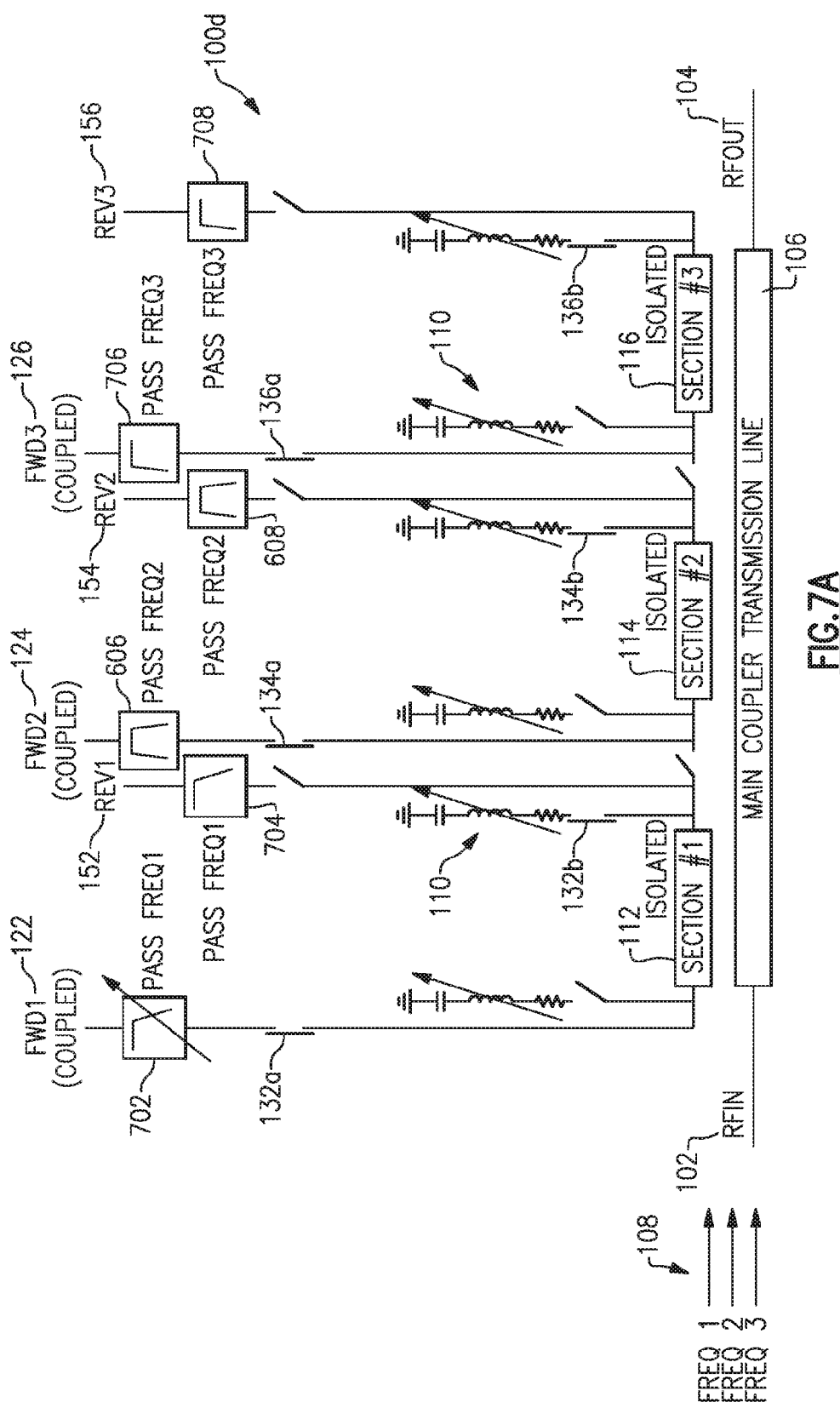
FIG. 7A is a circuit diagram illustrating another example of the multi-output EM coupler including frequency selective components according to aspects of the present invention.
Figure 7B:
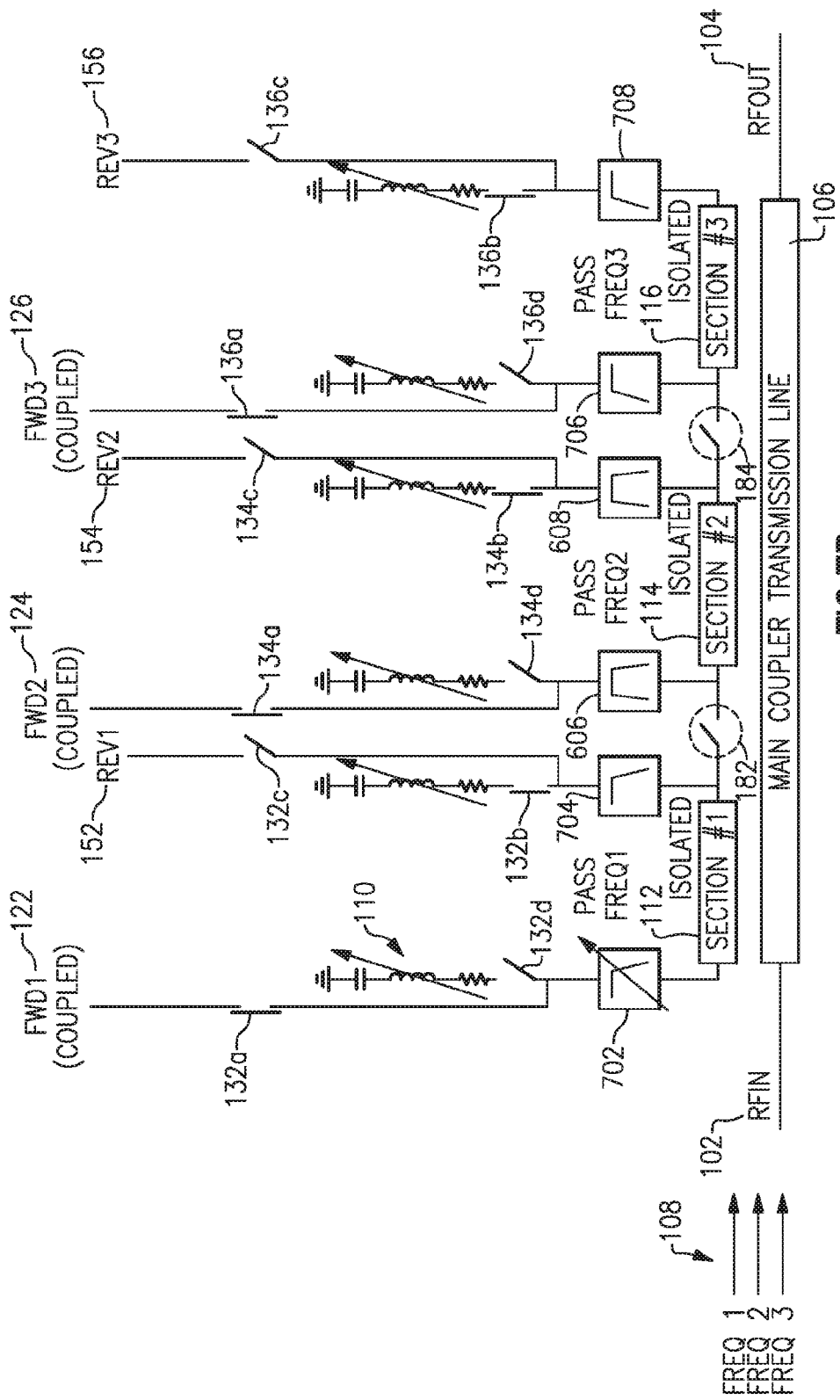
FIG. 7B is a circuit diagram illustrating another example of the multi-output EM coupler including frequency selective components according to aspects of the present invention.

In the example illustrated in FIGS. 7A and 7B, the input frequencies 108 include a first frequency band, freq1, a second frequency band, freq2 that includes higher frequencies than band freq1, and a third frequency band, freq3, that includes higher frequencies than band freq2. Accordingly, the multi-output EM coupler 100d is configured to accommodate these input frequencies 108. The EM coupler formed by the first coupled line section 112 and the main coupler transmission line 106 is optimized for the first frequency band, the EM coupler formed by the second coupled line section 114 and the main coupler transmission line 106 is optimized for the second frequency band, and the EM coupler formed by the third coupled line section 116 and the main coupler transmission line 106 is optimized for the third frequency band. However, as discussed above, those skilled in the art will readily appreciate that the structure may be modified to accommodate more or fewer input frequencies. In this example, the frequency selective components 702 and 704 associated with the first coupled line section 112 are lowpass filters configured to pass the first frequency band, freq1. The frequency selective components 606 and 608 associated with the second coupled line section 114 are bandpass filters, as in the above examples of FIGS. 6A and 6B, and configured to pass the second frequency band, freq2. The frequency selective components 706 and 708 associated with the third coupled line section 116 are highpass filters configured to pass the third frequency band, freq3. Any one or more of the frequency selective components 702, 704, 606, 608, 706, and/or 708 can be adjustable to allow the respective passed frequency band to be adjusted. Further, those skilled in the art will readily appreciate, given the benefit of this disclosure, that a wide variety of alternative configurations are possible and that the frequency selective components can be any of (optionally adjustable) lowpass, bandpass, or highpass filters, provided that they can be configured to pass a frequency band of interest and reject (e.g., through impedance mismatch or the appearance of being open circuited) other frequencies.

Figure 8:
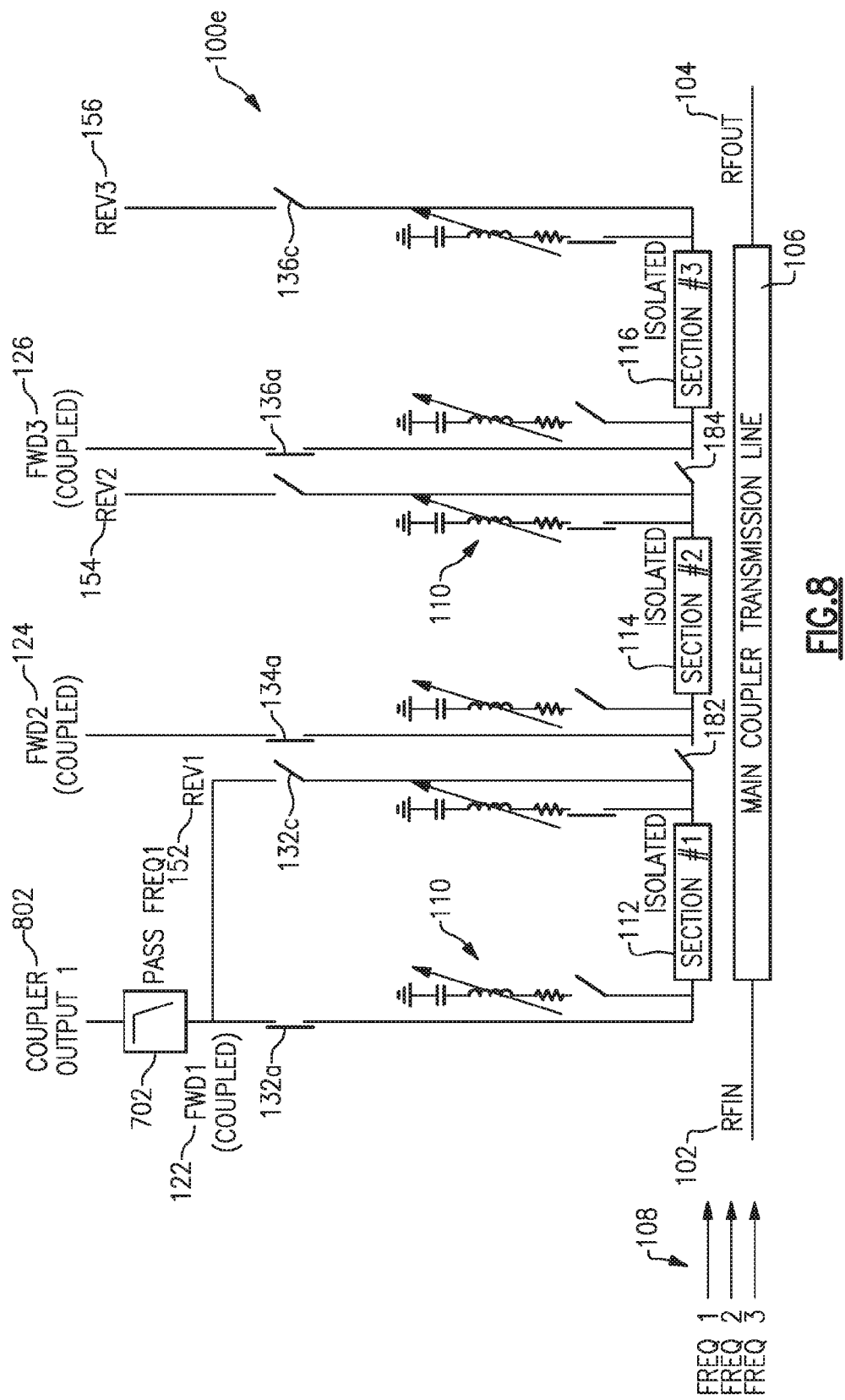
FIG. 8 is a circuit diagram illustrating another example of the multi-output EM coupler including frequency selective components according to aspects of the present invention.

In certain examples, frequency selective components associated with each coupled line section may not be needed, and therefore the multi-output EM coupler can be implemented using frequency selective components associated with any one or more of the coupled line sections, though not necessarily all coupled line sections. For example, FIG. 8 illustrates a configuration of a multi-output EM coupler 100e in which a lowpass filter 702 is associated with the coupled line section 112, and the EM couplers formed with the coupled line sections 114 and 116 do not include frequency selective components. The frequency selective components can be used in one or more coupled paths, as necessary by design. For example, frequency selective components may not be needed in every coupled path if two or more of the frequency bands are widely separated from one another. In another example, to minimize space, circuit complexity, and/or cost, while still optimizing insertion loss improvement, frequency selective components may be used only with the one or more coupled paths that exhibit a high out-of-band coupling factor (i.e., those that cause relatively high out-of-band loss along the main coupler transmission line 106).

Additionally, in certain embodiments switches can be used to route multiple coupled paths with the same frequency signals to share a frequency selective component. This can reduce the number of frequency selective components needed, and thereby save circuit space and/or cost. For example, as also illustrated in FIG. 8, the mode select switches 132a, 132c can be used to allow both the forward and reverse coupled paths of the EM coupler formed with the first coupled line section 112 to share the lowpass filter 702. Thus, both the forward coupled port 122 and the reverse coupled port 152 can be selectively connected via the lowpass filter 702 to a common first coupler output 802 using the mode select switches 132a and 132c. Those skilled in the art will appreciate, given the benefit of this disclosure, that this approach can be readily extended to the coupled paths associated with the second and/or third coupled line sections 114, 116. This approach can advantageously reduce the number of frequency selective components needed because typically forward and reverse EM power are not detected simultaneously; rather, the EM coupler is configured to operate in either the forward or the reverse mode at any given time, and therefore the forward and reverse coupled paths can share a common output.

Figure 9:
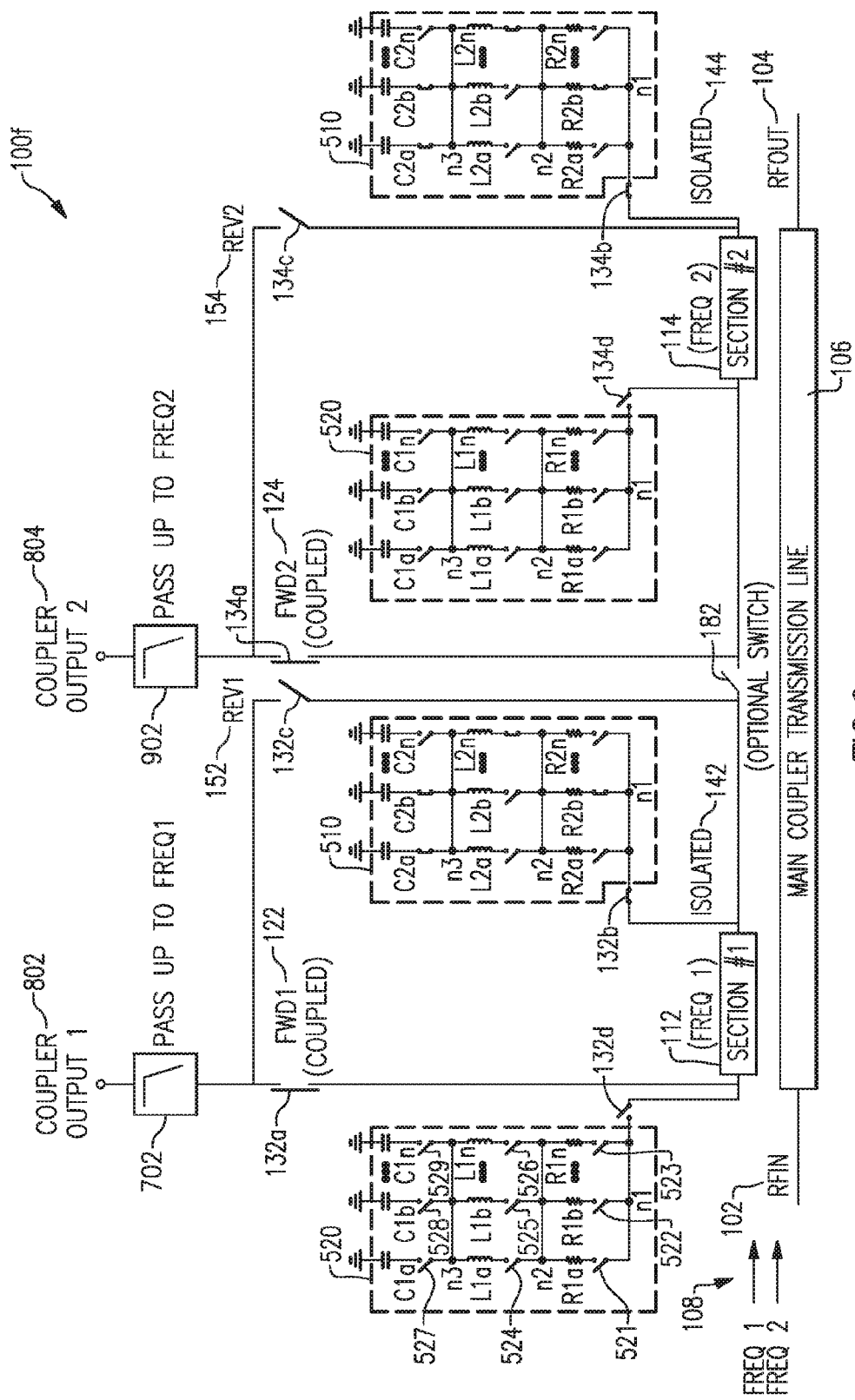
FIG. 9 is a circuit diagram illustrating another example of the multi-output EM coupler including frequency selective components and adjustable termination loads according to aspects of the present invention.

Referring to FIG. 9, in certain embodiments, the multi-output EM coupler can include both frequency selective components in one or more coupled paths and adjustable termination impedance circuits connected to one or more forward and/or reverse coupled ports. In the example illustrated in FIG. 9, the multi-output EM coupler 100f is shown, for simplicity, configured for two frequency bands (input frequencies 108 include the first frequency band, freq1 and the second frequency band, freq2); however, those skilled in the art will appreciate, given the benefit of this disclosure, that the approach can be readily extended to three or more coupled line sections. In the example of FIG. 9, the adjustable termination impedance circuits 510 are selectively connected to the forward isolated ports 142 and 144 via the isolation switches 132b and 134b, and the adjustable termination impedance circuits 520 are selectively connected to the reverse isolated ports via the isolation switches 132d and 134d, as discussed above with respect to FIG. 5. Although not shown in FIGS. 5 and 9, in certain embodiments, a single termination impedance circuit 510 or 520 can be shared by the forward and reverse isolated ports 142 and 162 and/or 144 and 164. For example, the isolation switches 132b and 132d can be replaced with a single throw double pole isolation switch that alternatively connects one of the forward isolated port 142 and the reverse isolated port 162 to the same termination impedance circuit 510 or 520. This configuration may save circuit space and/or cost by eliminating the need to have dedicated impedance termination circuits for each isolated port.

In addition, in this example, the mode select switches 132a, 132c selectively connect the forward and reverse coupled ports 122 and 152, respectively, via the lowpass filter 702 to the common first coupler output 802. Similarly, the mode select switches 134a, 134c, selectively connect the forward and reverse coupled ports 124 and 154, respectively, via a frequency selective component 902 to a second common coupler output 804. In the illustrated example, the frequency selective component 902 is a lowpass filter configured to pass frequencies up to and including the frequencies of the second frequency band, freq2. However, the frequency selective component 902 may alternatively be a bandpass filter or highpass filter configured to pass the second frequency band. As discussed above, either or both of the frequency selective components 702 and 902 can be adjustable.

According to certain embodiments, a frequency selective component can be used as a multiplexer, for example a diplexer or triplexer, depending on the number of coupled line sections included in the multi-output EM coupler, to allow the multiple coupled signals to be presented at one or more common coupler outputs. For example, referring to FIG. 10, there is illustrated an example of the multi-output EM coupler 100g including a diplexer 1002 that combines the signals from the coupled ports associated with each of the first and second coupled line sections 112, 114, and presents them at a common coupler output 1004. In the illustrated example, the multi-output EM coupler 100g is shown in the forward mode, and therefore mode select switches 132a and 134a are closed, connecting the forward coupled ports 122 and 124, respectively, to the diplexer 1002. Isolation switches 132b and 134b are closed, connecting adjustable termination impedance circuits 510 to the forward isolated ports 142 and 144, respectively. The reverse coupled paths can similarly be selectively connected to the same diplexer 1002 by closing the mode select switches 132c, 134c (and opening the mode select switches 132a, and 134a) and closing isolation switches 132d, 134d (and opening isolation switches 132b, 134b). In the illustrated example, the first frequency band freq1 is lower than the second frequency band, freq2, and therefore the diplexer 1002 includes a lowpass filter 1006 configured to pass freq1 and a highpass filter 1008 configured to pass freq2. However, a variety of other configurations of the diplexer 1002 can be implemented, depending upon the relationship between the first and second frequency bands. The common coupler output 1004 directs the coupled freq1 signal and the coupled freq2 signal to external circuitry (not shown). The passband (or stopband) of the diplexer 1002 can also be adjustable.

Figure 10:
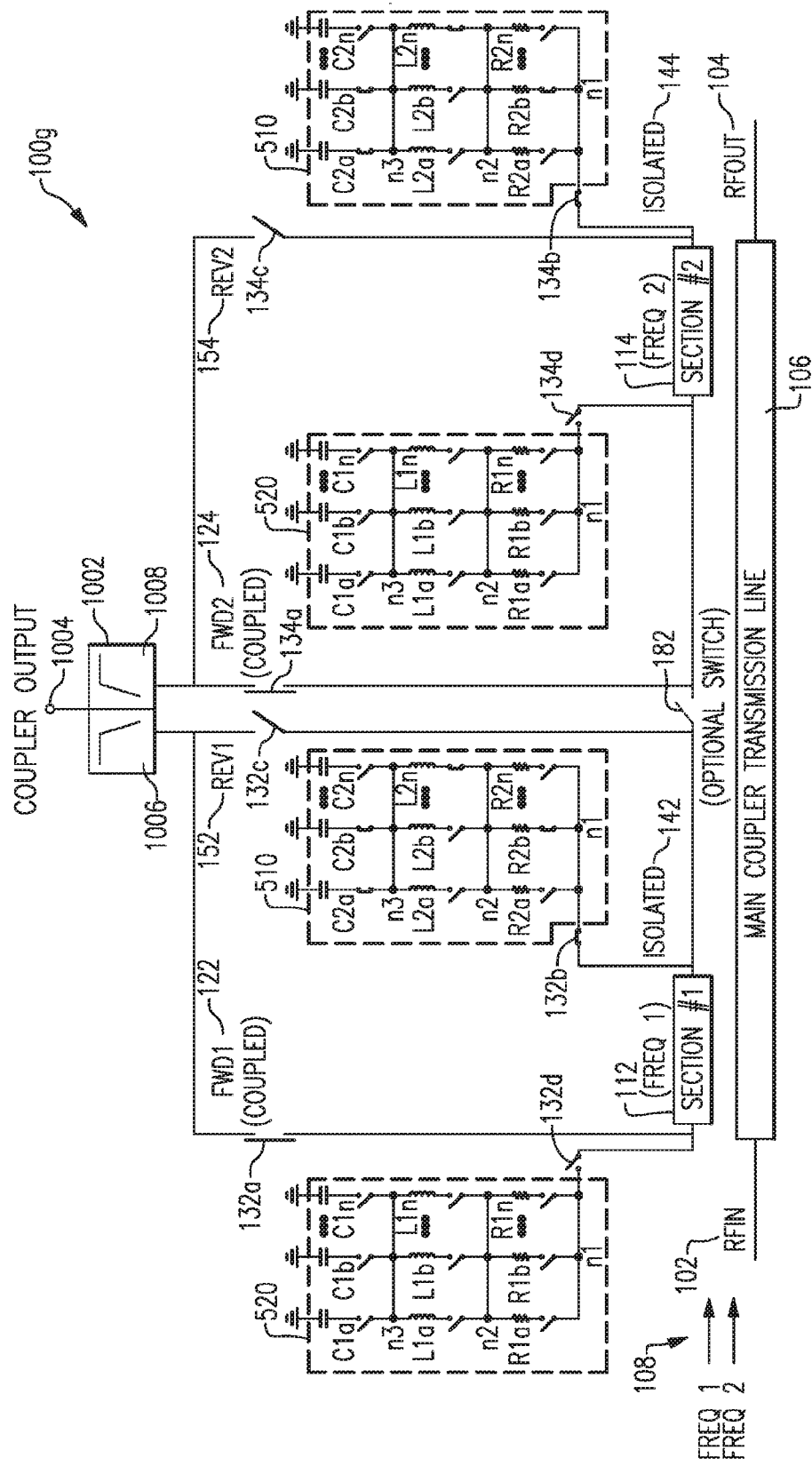
FIG. 10 is a circuit diagram of another example of the multi-output EM coupler including a diplexer on the coupled output according to aspects of the present invention.
Figure 11:
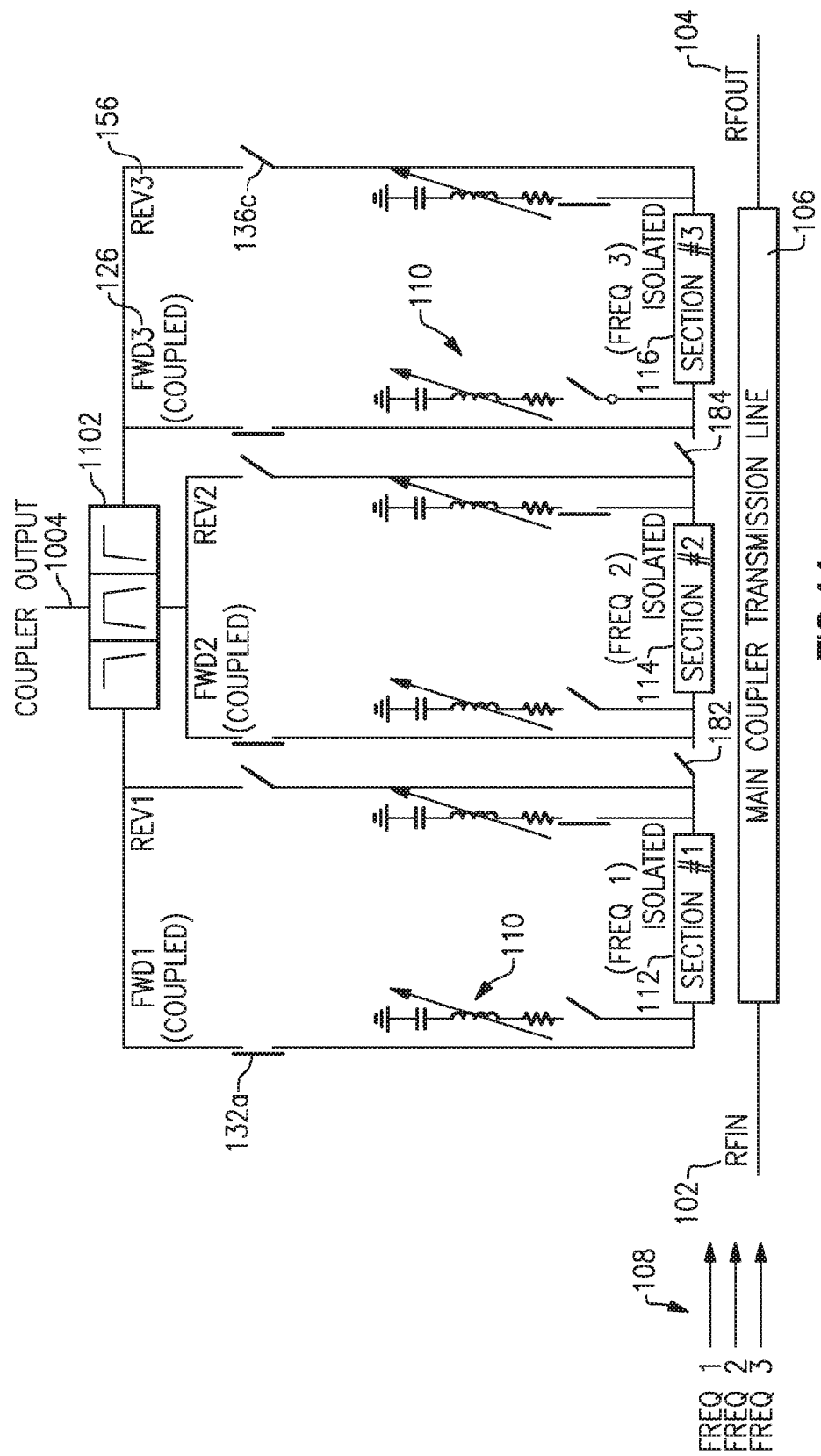
FIG. 11 is a circuit diagram of another example of the multi-output EM coupler including a triplexer on the coupled output according to aspects of the present invention.

Although only two coupled line sections (112 and 114) are shown for simplicity in FIG. 10, the approach can be readily extended to three or more coupled line sections. For example, FIG. 11 illustrates a configuration of the multi-output EM coupler 100h including a triplexer 1102 that connects the coupled paths from each of the three coupled line sections 112, 114, and 116 to the common coupler output 1004. The triplexer 1102 can also be adjustable. In FIG. 11, a termination load 110 is shown selectively connected to each of the forward and reverse isolated ports; however, any one or more of the termination loads 110 can be replaced with an adjustable termination impedance circuit 510 or 520. Similarly, in FIG. 10, any one or more of the adjustable termination impedance circuits 510 or 520 can be replaced with a termination load 110.

As described above, aspects and embodiments provide a highly configurable multi-output EM coupler which can provide numerous benefits over conventional systems in which multiple coupled output signals at different frequencies are needed. The multi-output EM coupler avoids the need for multiple individual couplers to accommodate multiple frequency bands by using a plurality of coupled line sections, and associated ports and circuitry, each of which can be optimized (e.g., in terms of insertion loss, coupling factor, and/or directivity) for a particular frequency or band of frequencies. This can also reduce or eliminate the need for filters in the main path. Thus, embodiments of the multi-output EM coupler can provide a reduction in size relative to conventional systems because the main coupler transmission line path can be shared by multiple coupled line sections, as discussed above. The coupling factor and directivity can be separately optimized for each frequency band of interest. As discussed above, insertion loss on the main transmission coupler line 106 can be improved through the use of switches to selectively decouple or "open circuit" coupled line sections where power detection or signal flow is not needed at any given time. Additionally, unnecessary coupling in frequencies outside of a frequency band of interest can be reduced.

Figure 12:
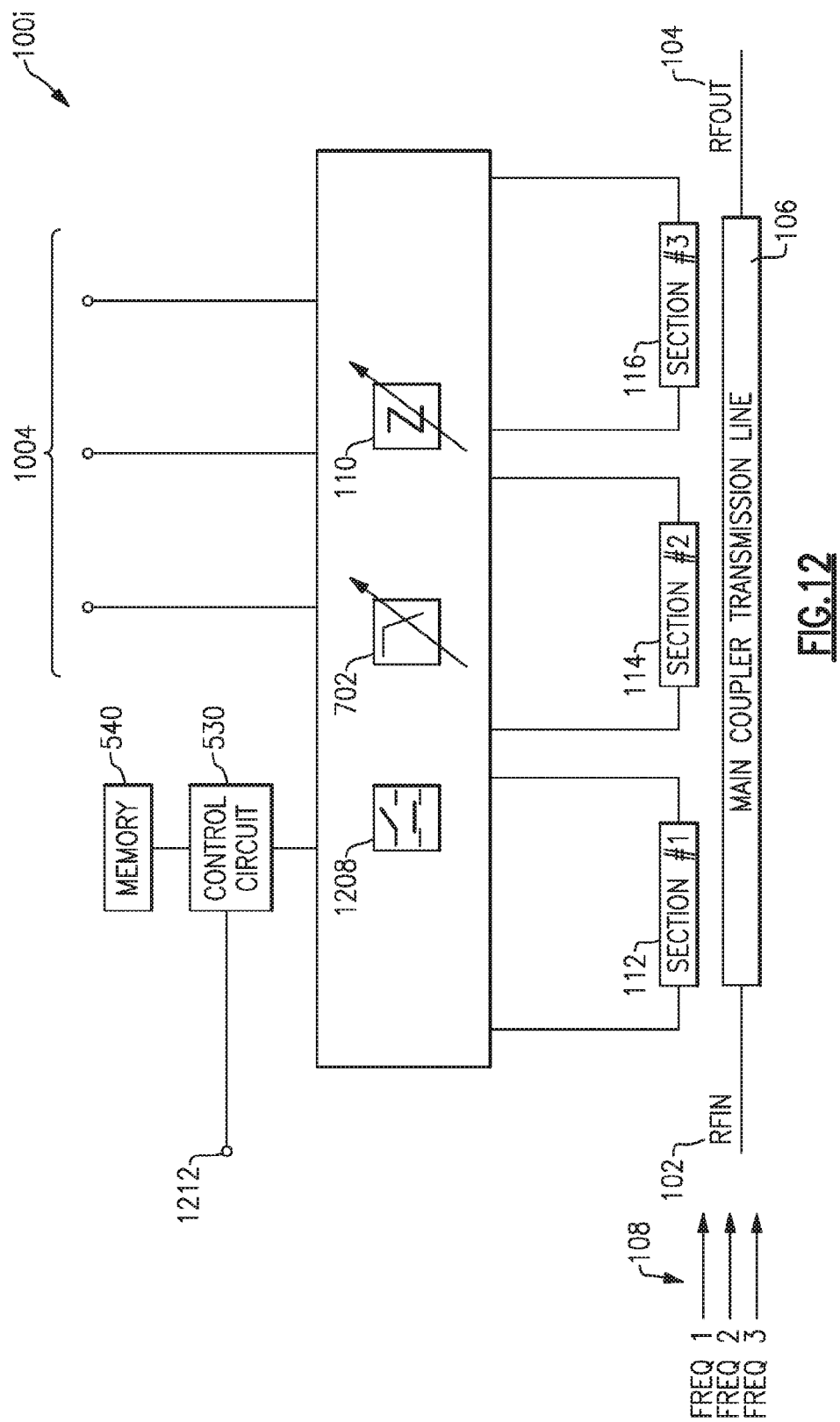
FIG. 12 is a block diagram of an example multi-output EM coupler including various generalized elements.

FIG. 12 is a block diagram of a generalized example of the multi-output EM coupler 100i in accordance with any of the principles and advantages discussed above with reference to any of the EM couplers of FIGS. 2-11. In the example illustrated in FIG. 12, the components include the main transmission line 106, multiple coupled line sections 112, 114, and 116, adjustable termination loads 110, filters (or other frequency selective components) 702, switches 1208 (e.g., mode select switches, isolation switches, etc.), a control circuit 530 with a memory 540 and an interface 1212 for communication and/or control. The termination loads 110, filters 702, and switches 1208 can include any of the termination loads, adjustable or not, frequency selective components, adjustable or not, and switch varieties, as discussed above with reference to FIGS. 2-11, or may include other varieties or combinations of these elements, or none of these elements. The control interface 1212 allows for communication with other circuitry (external to the EM coupler 100i) for configuration, command, and control of the EM coupler 100i via, e.g., the switches 1208, the termination loads 110, and filters 702. The control interface 1212 may include a serial or parallel data interface, or other input/output interfaces as will be appreciated by those skilled in the art, given the benefit of this disclosure. The EM coupler 100i also includes one or more coupled outputs 1004 that may be any of the coupled ports, forward, reverse, or multiplexed, as discussed above with reference to FIGS. 2-11, or may include other varieties or combinations. The EM coupler 100i may include contacts, such as pins, sockets, ball, lands, etc., corresponding to ports 102, 104, 1004 of the EM coupler 100i, along with one or more control interface 1212 contacts.

Figure 13:
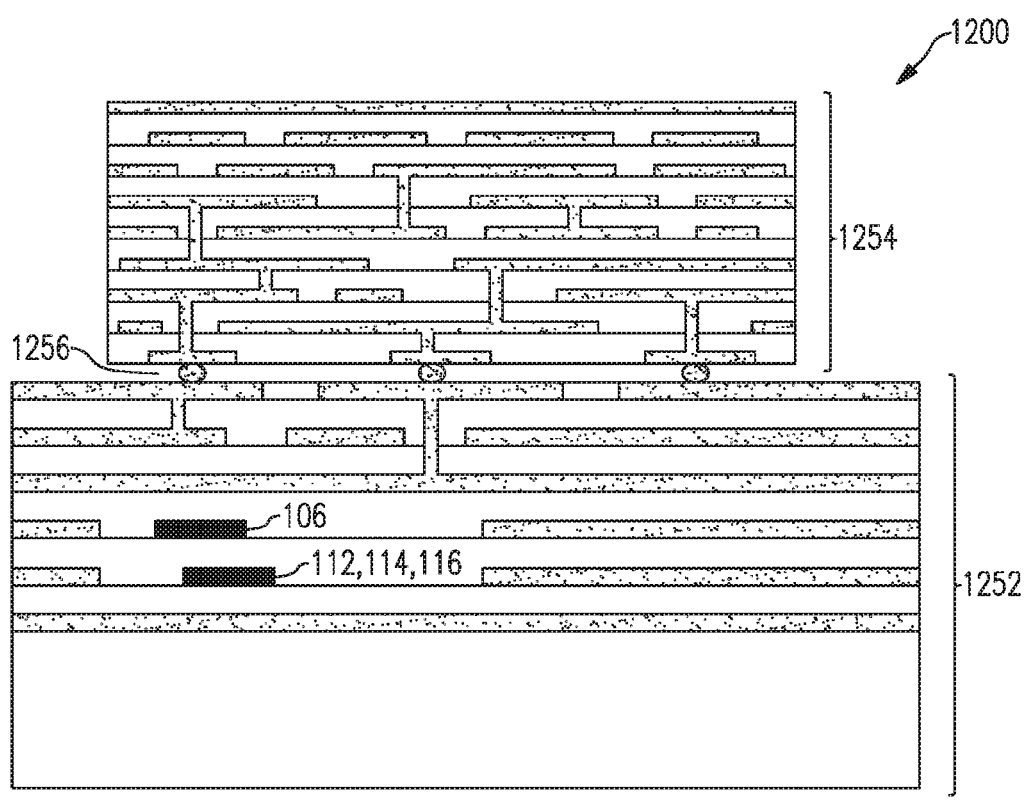
FIG. 13 is a schematic diagram illustrating an example manufacture of the multi-output EM coupler.

An EM coupler in accord with any of the embodiments described herein may be implemented or fabricated using integrated circuit techniques and may be provided in substrates or dies or may be incorporated into packaged modules, circuits, or devices. FIG. 13 illustrates some aspects of an example construction of any of the EM couplers described herein. The example of FIG. 13 includes a circuit stackup 1200 that includes a laminate substrate 1252 and a die 1254 mounted on and electrically connected to the laminate substrate 1252 via solder bumps 1256. The substrate 1252 and the die 1254 are each made up of multiple layers of conducting (e.g., metal) or semiconducting materials separated by dielectric, with interconnections between layers through conductive vias. In various embodiments, the die 1254 may be electrically connected to the substrate 1252 by other arrangements, such as pins, sockets, pads, balls, lands, etc. Other embodiments may include only a laminate substrate 1252 and no die 1254.

In the example of FIG. 13, the main and coupled line sections of the EM coupler are implemented within the layers of the substrate 1252. FIG. 13 shows an "end view" of the main transmission line 106 and the coupled line sections 112, 114, 116, in that the extent of their length may be perpendicular to the plane of the image. As shown, the coupled line sections 112, 114, 116 are formed on a layer below the main transmission line 106, and in proximity to the main transmission line 106 such that electromagnetic coupling between the main transmission line 106 and one or more of the coupled line sections 112, 114, 116 can occur, as discussed above. In embodiments, one or more of the coupled line sections 112, 114, 116 may be in the same layer as, and adjacent to, the main transmission line 106. In other embodiments the coupled line sections 112, 114, 116 can be formed on a layer above, rather than below, the main transmission line 106. The coupled line sections 112, 114, 116 need not all be formed in the same layer. In certain embodiments, any of the main transmission line 106 or coupled line sections 112, 114, 116 may include curved or angled sections and may not be straight. The main transmission line 106 and the coupled line sections 112, 114, 116, may be implemented in one or more layers of either the substrate 1252 or the die 1254. Additionally, switches, filters, impedances, control circuitry, communication interfaces, and memory, as discussed above, as well as other components, may be implemented within the stackup 1200 at one or more layers of the substrate 1252 or the die 1254, or may be distributed among the substrate 1252 and the die 1254, or may be external to the stackup 1200, or any combination of these.

Figure 14A:
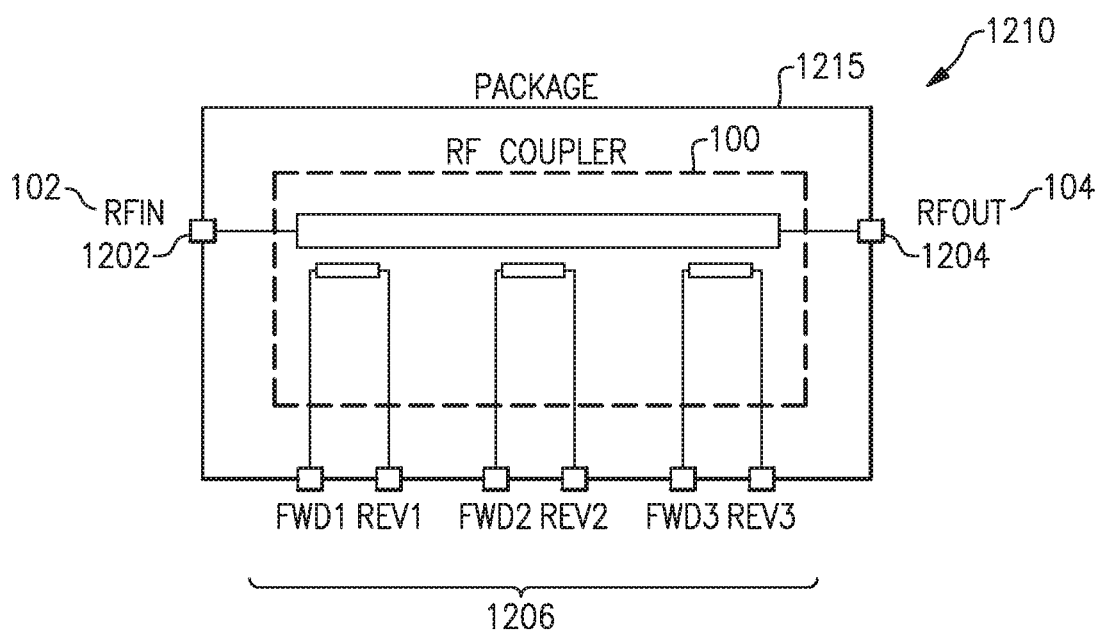
FIG. 14A is a block diagram of one example of a packaged module that includes the multi-output EM coupler according to aspects of the present invention.
Figure 14B:
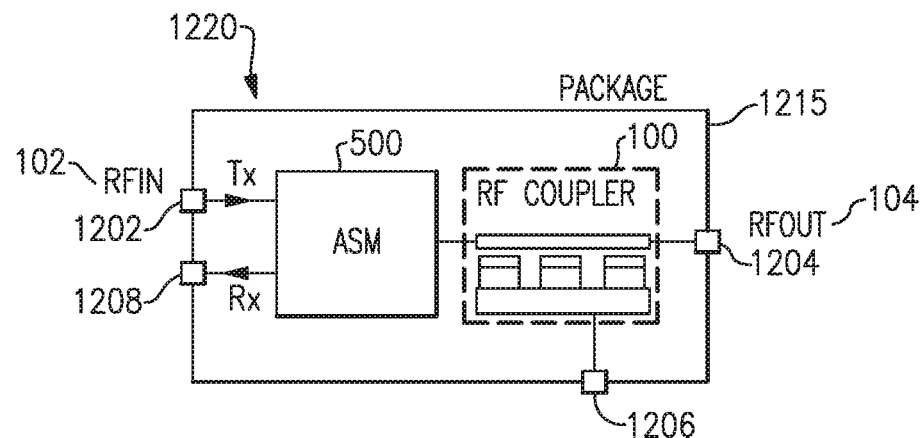
FIG. 14B is a block diagram of one example of a packaged module that includes the multi-output EM coupler and an antenna switch module, according to aspects of the present invention.
Figure 14C:
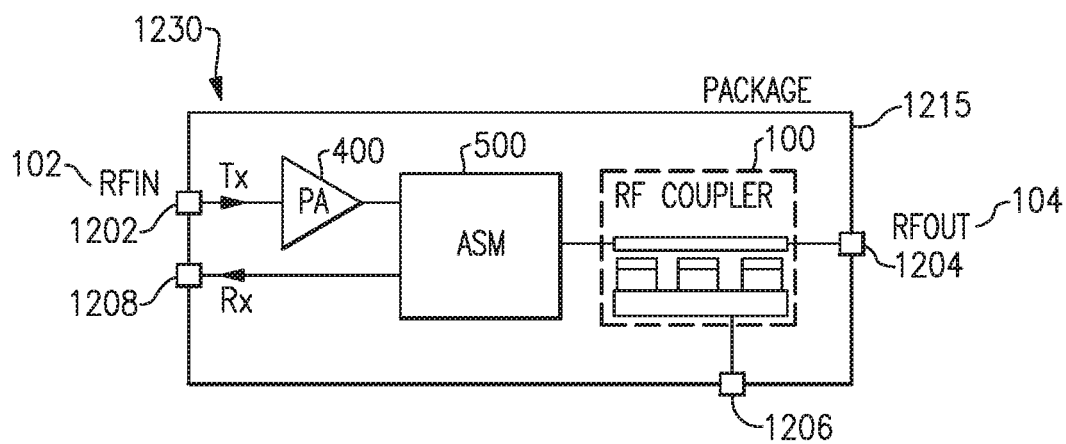
FIG. 14C is a block diagram of one example of a packaged module that includes the multi-output EM coupler, an antenna switch module, and a power amplifier, according to aspects of the present invention.

Embodiments of the multi-output EM couplers 100 described herein can be implemented in a variety of different modules including, for example, a stand-alone EM coupler, an antenna switch module, a module combining an EM coupler and an antenna switch module, an impedance matching module, an antenna tuning module, or the like. FIGS. 14A to 14C illustrate examples of modules that can include any of the multi-output EM couplers discussed herein. These example modules can include any combination of features associated with EM couplers, termination impedance circuits, switch networks and/or switch circuits, or the like.

FIG. 14A is a block diagram of one example of a packaged module 1210 that includes an embodiment of the multi-output EM coupler 100 in accordance with any of the principles and advantages discussed with reference to any of the EM couplers of FIGS. 2-11. The packaged module 1210 includes a substrate 1215 and an EM coupler 100 that may be implemented in the substrate 1215 or may be implemented on a die mounted upon the substrate 1215, or a combination, as discussed above with respect to FIG. 13. The packaged module 1210 includes packaging that encases the EM coupler 100 and at least a portion or all of the substrate 1215. The packaged module 1210 can include contacts, such as pins, sockets, balls, lands, etc., corresponding to each port of the EM coupler 100. In some embodiments, the packaged module 1210 can include a first contact 1202 corresponding to the input port 102, a second contact 1204 corresponding to the output port 104, and a set of contacts 1206 corresponding to the forward and reverse coupled ports/outputs. According to another embodiment, the packaged module 1210 can include a single contact for coupled power corresponding to either forward power or reverse power depending on the state of switches (not shown) in the packaged module 1210. Switches, termination impedance circuits, filters, and control capability in accordance with any of the principles and advantages discussed herein can be included within the packaging of any of the example modules illustrated in FIGS. 14A-14C.

FIG. 14B is a block diagram of an integrated switch and coupler module 1220 that includes an EM coupler 100 and an antenna switch 500. As discussed above, an antenna switch 500 can provide or enable connection through the EM coupler 100 in one or more paths, such as a transmit path via contact 1202 and a receive path via contact 1208, or others not shown. The EM coupler 100 may be implemented in the substrate 1215 or on a die mounted to the substrate 1215, or a combination of these, as discussed above. The antenna switch 500 may be implemented as a separate die that is mounted and attached to the substrate 1215, as shown in FIG. 14B, or may be implemented in the same die as the EM coupler 100. The module 1220 may include packaging that encases the EM coupler 100 and the antenna switch 500 and at least a portion or all of the substrate 1215.

FIG. 14C is a block diagram of an integrated amplifier, switch, and coupler module 1230 that includes an embodiment of the multi-output EM coupler 100, an antenna switch 500, and a power amplifier 400. In this embodiment of the module 1230, the power amplifier 400 is included in a transmit path. As with the modules 1210 and 1220 discussed above, the EM coupler 100 may be implemented in the substrate 1215 or on a die mounted to the substrate 1215, or a combination of these. The antenna switch 500 and the power amplifier 400 may be implemented as separate dies mounted to the substrate 1215, as shown, or in the same die. Either or both of the antenna switch 500 and the power amplifier 400 may be implemented in the same die as the EM coupler 100. The module 1230 may include package that encases the EM coupler 100, the antenna switch 500, and the power amplifier 400.

Additional packaged modules beyond those shown and described in FIGS. 14A-14C may include additional components in the various dies or substrates therein and embodiments of the multi-output EM couplers disclosed may be included in other packaged modules in similar manner to those described above with respect to FIGS. 14A-14C.

Embodiments of the multi-output EM couplers disclosed herein, optionally packaged into one of the modules 1210, 1220, or 1230 discussed above, or others, may be advantageously used in a variety of electronic devices, such as wireless devices (e.g., cell phones, tablets, etc.).

Figure 15:
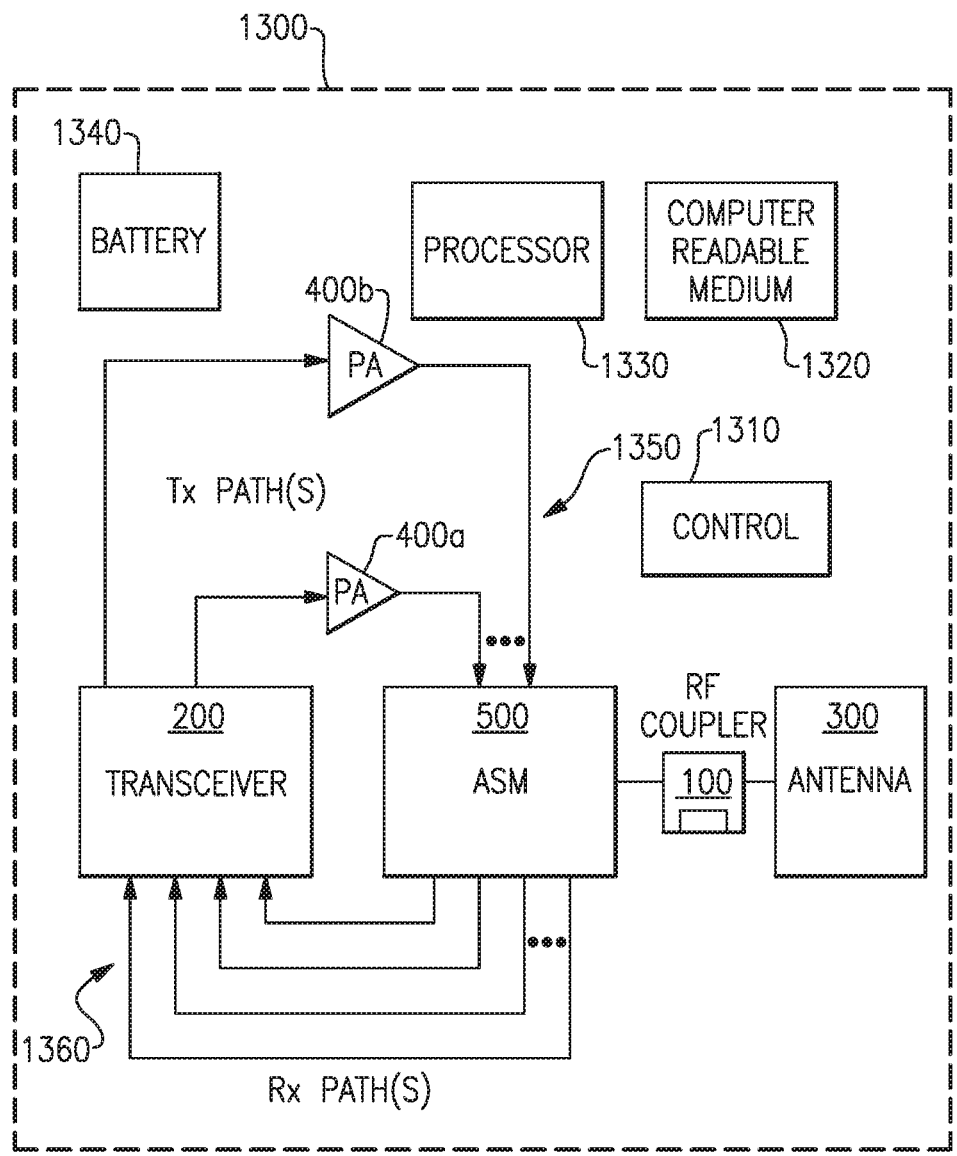
FIG. 15 is a block diagram of one example of a wireless device in which embodiments of the multi-output EM coupler can be used according to aspects of the present invention.
Figure 16A:
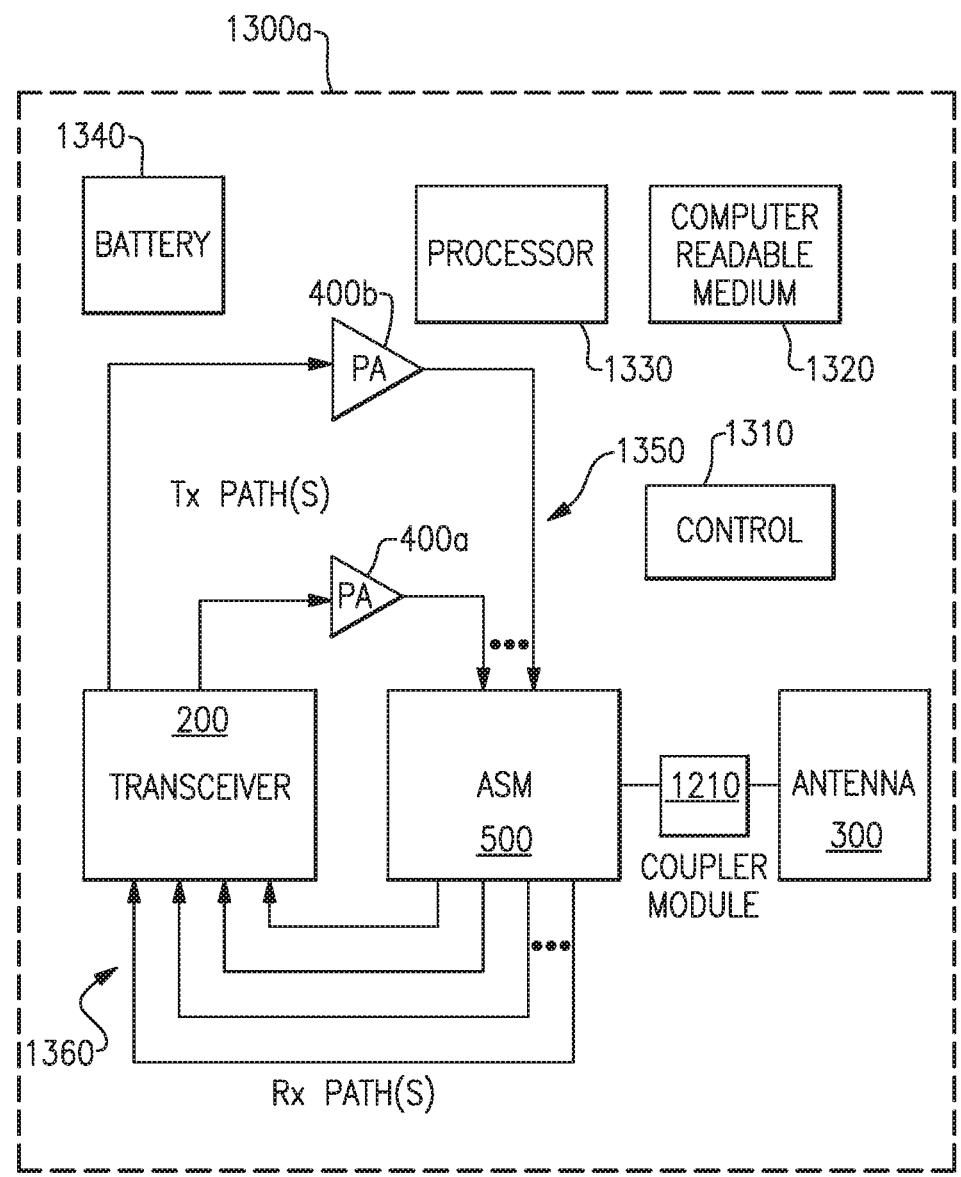
FIG. 16A is a block diagram of one example of the wireless device of FIG. 15 including the module of FIG. 14A according to aspects of the present invention.
Figure 16B:
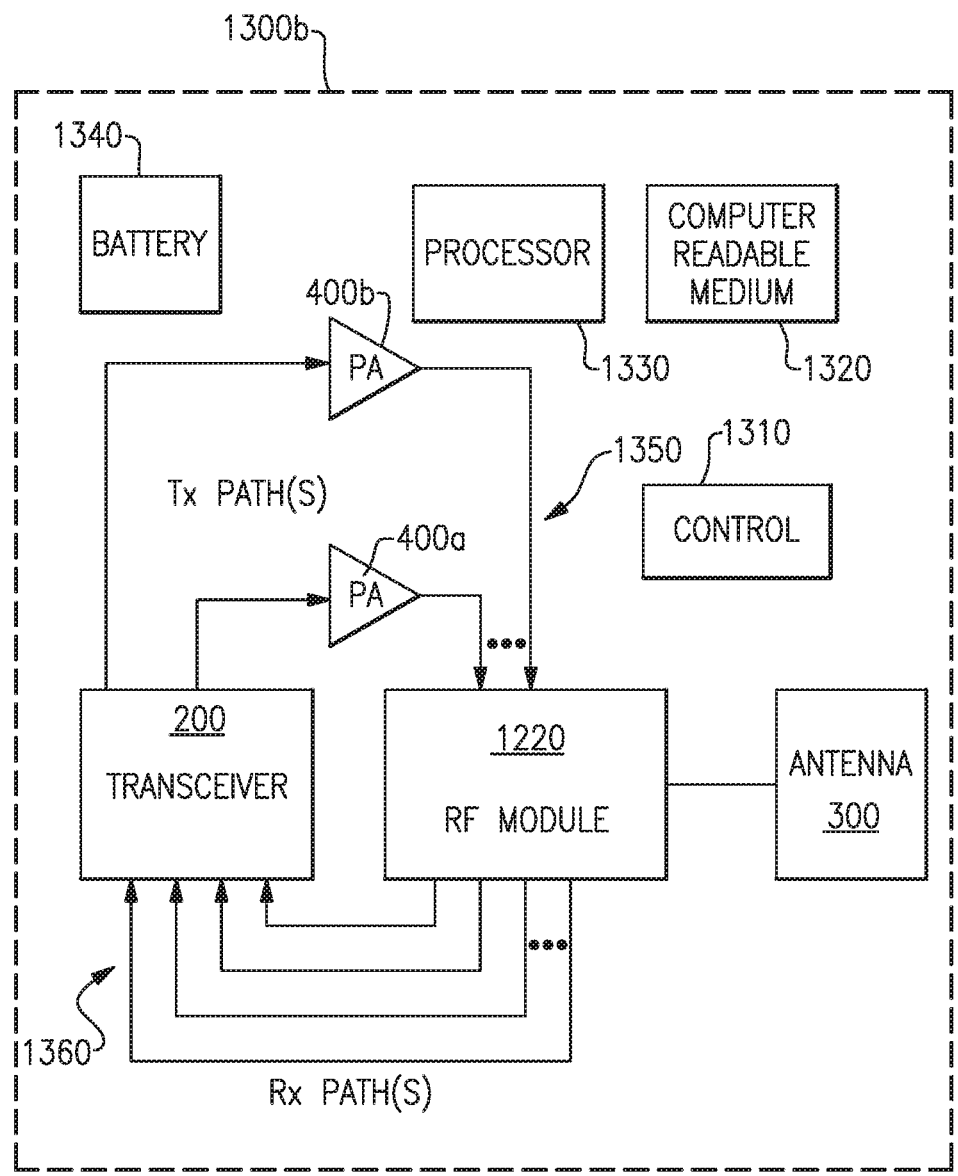
FIG. 16B is a block diagram of another example of the wireless device of FIG. 15 including the module of FIG. 14B according to aspects of the present invention.
Figure 16C:
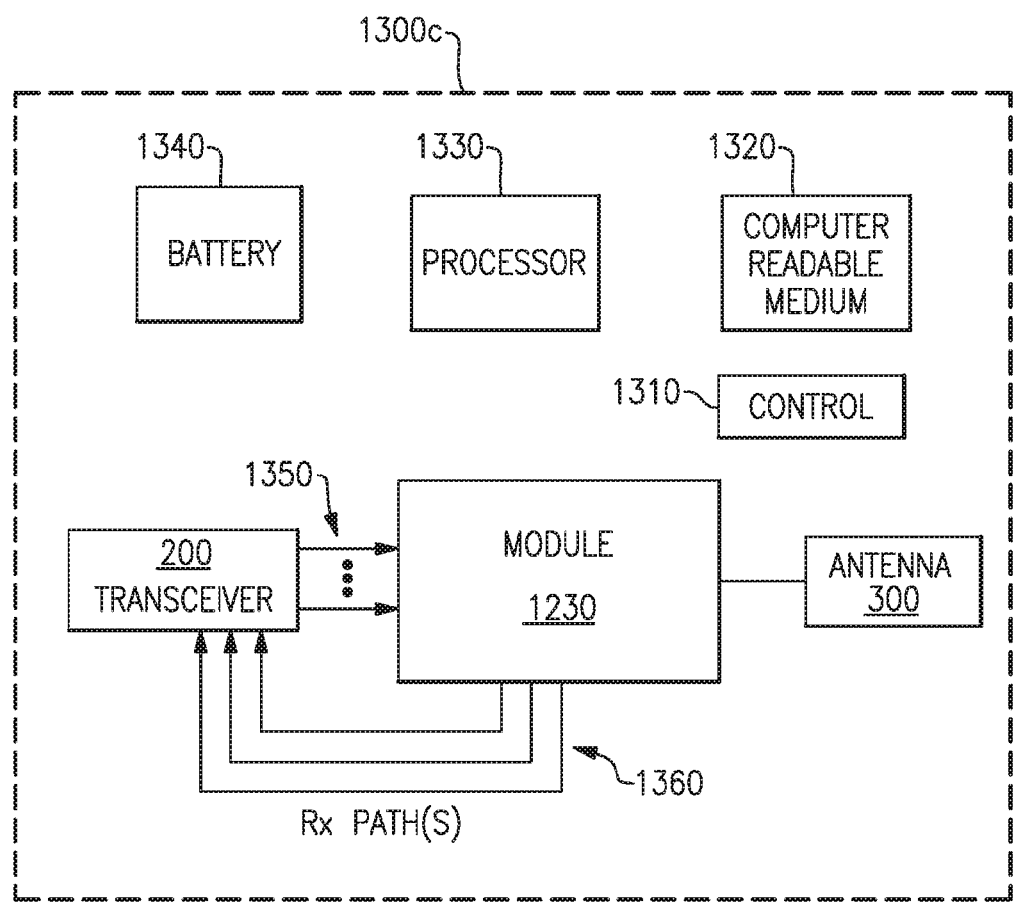
FIG. 16C is a block diagram of another example of the wireless device of FIG. 15 including the module of FIG. 14C according to aspects of the present invention.

FIG. 15 is a block diagram illustrating an example of a wireless device 1300 that can include one or more EM couplers having one or more features discussed herein. For instance, the example wireless device 1300 can include an EM coupler in accordance with any of the principles and advantages discussed with reference to any of the EM couplers of FIGS. 2-11. The example wireless device 1300 can be a mobile phone, such as a smart phone. The wireless device 1300 can include elements that are not illustrated in FIG. 15 and/or a subcombination of the illustrated elements. Further, as discussed above, the wireless device 1300 can include any of the modules 1210, 1220 or 1230. For example, FIG. 16A illustrates an example of the wireless device 1300a in which the EM coupler 100 is replaced with the module 1210. FIG. 16B illustrates another example of the wireless device 1300b in which the EM coupler 100 and the antenna switch 500 are replaced with the module 1220. FIG. 16C illustrates an example of the wireless device 1300c in which the EM coupler 100, ASM 500, and power amplifiers 400a, 400b are replaced with the module 1230.

The wireless device 1300 depicted in FIG. 15, or any of the alternative wireless devices 1300a-c, can represent a multi-band and/or multi-mode device such as a multi-band/multi-mode mobile phone. By way of example, the wireless device 1300 can communicate in accordance with Long Term Evolution (LTE). In this example, the wireless device 1300 can be configured to operate at one or more frequency bands defined by an LTE standard. The wireless device 1300 can alternatively or additionally be configured to communicate in accordance with one or more other communication standards, including but not limited to one or more of a Wi-Fi standard, a Bluetooth standard, a 3G standard, a 4G standard or an Advanced LTE standard.

As illustrated in FIG. 15, the wireless device 1300 can include a transceiver 200, an antenna switch 500, an EM coupler 100, an antenna 300, power amplifiers 400, a control component 1310, a computer readable storage medium 1320, a processor 1330, and a battery 1340.

As discussed above with reference to FIG. 1, the transceiver 200 can generate EM signals for transmission via the antenna 300. Furthermore, the transceiver 200 can receive incoming EM signals from the antenna 300. It will be understood that various functionalities associated with transmitting and receiving signals can be achieved by one or more components that are collectively represented in FIG. 15 as the transceiver 1300. For example, a single component can be configured to provide both transmitting and receiving functionalities. In another example, transmitting and receiving functionalities can be provided by separate components.

In FIG. 15, one or more output signals from the transceiver 200 are depicted as being provided to the antenna 300 via one or more transmission paths 1350. In the example shown, different transmission paths 1350 can represent output paths associated with different frequency bands (e.g., a high band and a low band) and/or different power outputs. One or more of the transmission paths 1350 can be associated with different transmission modes. One or more of the illustrated transmission paths 1350 can be active while one or more of the other transmission paths 1350 are non-active. Other transmission paths 1350 can be associated with different power modes (e.g., high power mode and low power mode) and/or paths associated with different transmit frequency bands. The transmission paths 1350 can include one or more power amplifiers 400 to aid in boosting an EM signal having a relatively low power to a higher power suitable for transmission. As illustrated, the power amplifiers 400a and 400b can include the power amplifier 400 discussed above with reference to FIG. 1. The wireless device 1300 can be adapted to include any suitable number of transmission paths 1350.

In FIG. 15, one or more signals from the antenna 300 are depicted as being provided to the transceiver 200 via one or more receive paths 1360. In the example shown, different receive paths 1360 can represent paths associated with different signaling modes and/or different receive frequency bands. The wireless device 1300 can be adapted to include any suitable number of receive paths 1360.

To facilitate switching between receive and/or transmit paths, the antenna switch 500 can be included and can be used to selectively electrically connect the antenna 300 to a selected transmit or receive path. Thus, the antenna switch 500 can provide a number of switching functionalities associated with an operation of the wireless device 1300. The antenna switch 500 can include a multi throw switch configured to provide functionalities associated with, for example, switching between different bands, switching between different modes, switching between transmission and receiving modes, or any combination thereof.

The EM coupler 100 can be disposed between the antenna switch 500 and the antenna 300. The EM coupler 100 can provide an indication of forward power provided to the antenna 300 and/or an indication of reverse power reflected from the antenna 300. The indications of forward and reverse power can be used, for example, to compute a reflected power ratio, such as a return loss, a reflection coefficient, or a voltage standing wave ratio (VSWR). The EM coupler 100 illustrated in FIG. 15 can implement any of the principles and advantages of the EM couplers discussed herein.

FIG. 15 illustrates that in certain embodiments, a control component 1310 can be provided for controlling various control functionalities associated with operations of the antenna switch 500 and/or other operating component(s). For example, the control component 1310 can aid in providing control signals to the antenna switch 500 so as to select a particular transmit or receive path. As another example, the control component 1310 can provide control signals to configure the EM coupler 100 and/or an associated termination impedance circuit and/or an associated switch network in accordance with any of the principles and advantages discussed herein.

In certain embodiments, the at least one processor 1330 can be configured to facilitate implementation of various processes on the wireless device 1300. The at least one processor 1330 can be, for example, a general purpose processor or a special purpose processor. In certain implementations, the wireless device 1300 can include a non-transitory computer readable medium 1320, such as a memory, which can store computer program instructions that may be provided to and executed by the at least one processor 1330.

The battery 1340 can be any suitable battery for use in the wireless device 1300, including, for example, a lithium-ion battery.

Some of the embodiments described above have provided examples in connection with power amplifiers and/or mobile devices. However, the principles and advantages of the embodiments can be used for any other systems or apparatus, such as any uplink cellular device, that could benefit from any of the circuits described herein. Any of the principles and advantages discussed herein can be implemented in an electronic system with a need for detecting and/or monitoring a power level associated with an EM signal, such as forward EM power and/or a reverse EM power. Any of the switch networks and/or switch circuit discussed herein can alternatively or additionally be implemented by any other suitable logically equivalent and/or functionally equivalent switch networks. The teachings herein are applicable to a variety of power amplifier systems including systems with multiple power amplifiers, including, for example, multi-band and/or multi-mode power amplifier systems. The power amplifier transistors discussed herein can be, for example, gallium arsenide (GaAs), complementary metal oxide semiconductor (CMOS), or silicon germanium (SiGe) transistors. Moreover, power amplifiers discussed herein can be implemented by FETs and/or bipolar transistors, such as heterojunction bipolar transistors.

Aspects of this disclosure can be implemented in various electronic devices. Examples of the electronic devices can include, but are not limited to, consumer electronic products, parts of the consumer electronic products, electronic test equipment, cellular communications infrastructure such as a base station, etc. Examples of the electronic devices can include, but are not limited to, a mobile phone such as a smart phone, a telephone, a television, a computer monitor, a computer, a modem, a hand held computer, a laptop computer, a tablet computer, an electronic book reader, a wearable computer such as a smart watch, a personal digital assistant (PDA), a microwave, a refrigerator, an automobile, a stereo system, a DVD player, a CD player, a digital music player such as an MP3 player, a radio, a camcorder, a camera, a digital camera, a portable memory chip, a health care monitoring device, a vehicular electronics system such as an automotive electronics system or an avionics electronic system, a washer, a dryer, a washer/dryer, a peripheral device, a wrist watch, a clock, etc. Further, the electronic devices can include unfinished products.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-output electromagnetic coupler comprising:
a main coupler transmission line extending between and electrically connecting an input port and an output port;
a first coupled line section configured to couple electromagnetic power in a first frequency band from the main coupler transmission line to provide a first coupled output signal at a first coupled port;
a second coupled line section configured to couple electromagnetic power in a second frequency band from the main coupler transmission line to provide a second coupled output signal at a second coupled port simultaneously with the first coupled output signal being provided at the first coupled port; and
a plurality of switches configured to selectively connect an end of the first coupled line section to a termination impedance in a first mode of operation, to the first coupled port in a second mode of operation, and to an end of the second coupled line section in a third mode of operation, each of the selective connections being mutually exclusive of the other selective connections.

2. The multi-output electromagnetic coupler of claim 1 further comprising a frequency selective component selectively connected to the first coupled port and configured to pass the first frequency band and to reject the second frequency band.

3. The multi-output electromagnetic coupler of claim 2 wherein the frequency selective component is one of a lowpass filter, a bandpass filter, and a highpass filter.

4. The multi-output electromagnetic coupler of claim 2 wherein the frequency selective component is adjustable.

5. The multi-output electromagnetic coupler of claim 1 wherein the plurality of switches includes a first series switch disposed between the first coupled line section and the second coupled line section and configured to selectively connect the first coupled line section and the second coupled line section together in series.

6. The multi-output electromagnetic coupler of claim 5 further comprising a third coupled line section configured to couple electromagnetic power in a third frequency band from the main coupler transmission line to provide a third coupled output signal at a third coupled port simultaneously with the first coupled output signal being provided at the first coupled port and the second coupled output signal being provided at the second coupled port.

7. The multi-output electromagnetic coupler of claim 6 further comprising a second series switch disposed between the second coupled line section and the third coupled line section and configured to selectively connect the second coupled line section and the third coupled line section together in series.

8. The multi-output electromagnetic coupler of claim 1 further comprising a switch network configured to selectively decouple the second coupled line section from the main coupler transmission line.

9. The multi-output electromagnetic coupler of claim 1 wherein the first coupled line section is connected to a first isolated port and the second coupled line section is connected to a second isolated port, the multi-output electromagnetic coupler further comprising:
a first termination load connected to the first isolated port; and
a second termination load connected to the second isolated port.

10. The multi-output electromagnetic coupler of claim 9 wherein at least one of the first and second termination loads is an adjustable termination impedance circuit.

11. The multi-output electromagnetic coupler of claim 10 wherein the adjustable termination impedance circuit includes a switch network and a plurality of passive impedance elements.

12. The multi-output electromagnetic coupler of claim 11 further comprising:
a memory configured to store an impedance value for the adjustable termination impedance circuit; and
a control circuit connected to the memory and to the adjustable termination impedance circuit, and configured to control the switch network to selectively couple together ones of the plurality of passive impedance elements to set a termination impedance provided by the adjustable termination impedance circuit to the impedance value.

13. The multi-output electromagnetic coupler of claim 12 wherein the plurality of passive impedance elements includes at least one of resistive elements, capacitive elements, and inductive elements.

14. A multi-output electromagnetic coupler comprising:
a main coupler transmission line extending between and electrically connecting an input port and an output port;

a first coupled line section configured to couple electromagnetic power in a first frequency band from the main coupler transmission line to provide a first coupled output signal at a first coupled port;

a second coupled line section configured to couple electromagnetic power in a second frequency band from the main coupler transmission line to provide a second coupled output signal at a second coupled port simultaneously with the first coupled output signal being provided at the first coupled port; and a diplexer connected to the first and second coupled ports and configured to direct the first and second coupled output signals to a common coupled output port.

15. The multi-output electromagnetic coupler of claim 14 further comprising a first series switch disposed between the first coupled line section and the second coupled line section and configured to selectively connect the first coupled line section and the second coupled line section together in series.

16. The multi-output electromagnetic coupler of claim 14 further comprising a third coupled line section configured to couple electromagnetic power in a third frequency band from the main coupler transmission line to provide a third coupled output signal at a third coupled port simultaneously with the first coupled output signal being provided at the first coupled port and the second coupled output signal being provided at the second coupled port.

17. The multi-output electromagnetic coupler of claim 16 further comprising a first series switch disposed between the first coupled line section and the second coupled line section and configured to selectively connect the first coupled line section and the second coupled line section together in series, and a second series switch disposed between the second coupled line section and the third coupled line section and configured to selectively connect the second coupled line section and the third coupled line section together in series.

18. The multi-output electromagnetic coupler of claim 14 further comprising a switch network configured to selectively decouple the second coupled line section from the main coupler transmission line.

19. The multi-output electromagnetic coupler of claim 14 wherein the first coupled line section is connected to a first isolated port and the second coupled line section is connected to a second isolated port, the multi-output electromagnetic coupler further comprising:

a first termination load connected to the first isolated port; and a second termination load connected to the second isolated port.

20. A system comprising:

a transceiver configured to produce an electromagnetic transmit signal;

a multi-output electromagnetic coupler including a main coupler transmission line extending between and electrically connecting an input port and an output port, the multi-output electromagnetic coupler being configured to receive the electromagnetic transmit signal at the input port, the multi-output electromagnetic coupler further including a first coupled line section configured to couple electromagnetic power in a first frequency band from the main coupler transmission line to provide a first coupled output signal at a first coupled port of the multi-output electromagnetic coupler, a second coupled line section configured to couple electromagnetic power in a second frequency band from the main coupler transmission line to provide a second coupled output signal at a second coupled port of the multi-output electromagnetic coupler simultaneously with the first coupled output signal being provided at the first coupled port, and a plurality of switches configured to selectively connect an end of the first coupled line section to a termination impedance in a first mode of operation, to the first coupled port in a second mode of operation, and to an end of the second coupled line section in a third mode of operation, each of the selective connections being mutually exclusive of the other selective connections; and an antenna switch module configured to connect the transceiver to the multi-output electromagnetic coupler and to direct the electromagnetic transmit signal to the input port of the multi-output electromagnetic coupler.

21. The system of claim 20 further comprising a power amplifier connected between the transceiver and the antenna switch module, the power amplifier being configured to receive and amplify the electromagnetic transmit signal.

22. The system of claim 20 further comprising an antenna connected to the output port of the multi-output electromagnetic coupler, the antenna being configured to transmit the electromagnetic transmit signal and to receive an electromagnetic receive signal.

23. The system of claim 22 wherein the multi-output electromagnetic coupler is further configured to receive the electromagnetic receive signal at the output port and to provide the electromagnetic receive signal at the input port, and the antenna switch module is further configured to direct the electromagnetic receive signal to the transceiver.

24. The system of claim 20 further comprising a frequency selective component selectively connected to the first coupled port and configured to pass the first frequency band and to reject the second frequency band.

25. The system of claim 24 wherein the frequency selective component is adjustable.

* * * * *